United States Patent
Tsuboi et al.

(10) Patent No.: US 9,733,793 B2
(45) Date of Patent: Aug. 15, 2017

(54) IMAGE FORMING APPARATUS AND TERMINAL DEVICE EACH HAVING TOUCH PANEL

(75) Inventors: Tomo Tsuboi, Itami (JP); Toshimichi Iwai, Kitakatsuragi-gun (JP); Takehisa Yamaguchi, Ikoma (JP); Kazumi Sawayanagi, Itami (JP); Akihiro Torigoshi, Amagasaki (JP)

(73) Assignee: Konica Minolta, Inc., Tokyo (JP)

( * ) Notice: Subject to any disclaimer, the term of this patent is extended or adjusted under 35 U.S.C. 154(b) by 977 days.

(21) Appl. No.: 13/369,888

(22) Filed: Feb. 9, 2012

(65) Prior Publication Data
US 2012/0206388 A1   Aug. 16, 2012

(30) Foreign Application Priority Data

Feb. 10, 2011   (JP) ................. 2011-026754

(51) Int. Cl.
*G06F 3/041*   (2006.01)
*G06F 3/0482*  (2013.01)
(Continued)

(52) U.S. Cl.
CPC ........ *G06F 3/0482* (2013.01); *G06F 3/04883* (2013.01); *H04N 1/00307* (2013.01);
(Continued)

(58) Field of Classification Search
CPC ............... G06F 3/04842; G06F 3/0482; G06F 3/04883; G06F 2203/04808; H04N 1/00307; H04N 1/00411; H04N 1/00424
See application file for complete search history.

(56) References Cited

U.S. PATENT DOCUMENTS 6,470,341 B1 * 10/2002 Rekimoto
7,088,344 B2    8/2006 Maezawa et al.
(Continued)

FOREIGN PATENT DOCUMENTS

JP   8-76926    3/1996
JP   11-73271   3/1999
(Continued)

OTHER PUBLICATIONS

Notice of Grounds of Rejection mailed Apr. 23, 2013, directed to JP Application No. 2011-026754; 5 pages.

*Primary Examiner* — Amare Mengistu
*Assistant Examiner* — Crystal A Mathews
(74) *Attorney, Agent, or Firm* — Osha Liang LLP

(57) ABSTRACT

Continuously after two contacts are made on a touch panel, when a gesture of moving the two contacts in a direction that a spacing therebetween is decreased and then releasing the two contacts after being moved is detected, an image forming apparatus identifies a program presented by an icon displayed in an area defined by the two contacts at least either of before and after being moved, as a program subjected to the gesture, and stores information that identifies the program subjected to the gesture. The image forming apparatus reads the information that identifies the program subjected to the gesture in accordance with a command related to the program subjected to the gesture to execute an operation related to the program, and transmits information depending on the operation to another device indicated by the command.

16 Claims, 16 Drawing Sheets

(51) Int. Cl.
*G06F 3/0488* (2013.01)
*H04N 1/00* (2006.01)

(52) U.S. Cl.
 CPC ..... *H04N 1/00411* (2013.01); *H04N 1/00424* (2013.01); *G06F 2203/04808* (2013.01)

(56) References Cited

U.S. PATENT DOCUMENTS

| | | | |
|---|---|---|---|
| 2002/0198944 A1* | 12/2002 | Moss | 709/206 |
| 2005/0270569 A1* | 12/2005 | Hayashi | 358/1.15 |
| 2008/0144071 A1* | 6/2008 | Uchikawa | 358/1.14 |
| 2008/0152263 A1* | 6/2008 | Harrison | 382/313 |
| 2009/0244015 A1* | 10/2009 | Sengupta et al. | 345/173 |
| 2010/0033760 A1* | 2/2010 | Kimura | 358/1.15 |
| 2010/0073713 A1* | 3/2010 | Chae | 358/1.15 |
| 2010/0090971 A1* | 4/2010 | Choi et al. | 345/173 |
| 2010/0214604 A1* | 8/2010 | Hosono et al. | 358/1.15 |
| 2011/0081923 A1* | 4/2011 | Forutanpour et al. | 455/457 |
| 2011/0083111 A1* | 4/2011 | Forutanpour et al. | 715/863 |
| 2011/0163944 A1* | 7/2011 | Bilbrey et al. | 345/156 |
| 2011/0175822 A1* | 7/2011 | Poon et al. | 345/173 |
| 2011/0193788 A1* | 8/2011 | King et al. | 345/173 |
| 2011/0298732 A1* | 12/2011 | Yoshimoto et al. | 345/173 |
| 2012/0096368 A1* | 4/2012 | McDowell | 715/748 |
| 2012/0180003 A1* | 7/2012 | Sawayanagi et al. | 715/863 |
| 2012/0192120 A1* | 7/2012 | Yamaguchi | G03G 15/502 715/863 |
| 2012/0254746 A1* | 10/2012 | Avadhanam | 715/702 |
| 2012/0272157 A1* | 10/2012 | Tajima | G06F 21/606 715/748 |
| 2012/0296979 A1* | 11/2012 | Iwai | H04L 65/403 709/205 |
| 2012/0300247 A1* | 11/2012 | Hama | H04N 1/00204 358/1.14 |
| 2012/0324368 A1* | 12/2012 | Putz et al. | 715/748 |
| 2013/0031516 A1* | 1/2013 | Sawayanagi | H04N 1/00411 715/863 |
| 2013/0044340 A1* | 2/2013 | Hama et al. | 358/1.13 |

FOREIGN PATENT DOCUMENTS

| | | |
|---|---|---|
| JP | 2000-163193 | 6/2000 |
| JP | 2000-163444 | 6/2000 |
| JP | 2002-123369 | 4/2002 |
| JP | 2009-171234 | 7/2009 |

* cited by examiner

IMAGE FORMING APPARATUS AND TERMINAL DEVICE EACH HAVING TOUCH PANEL

This application is based on Japanese Patent Application No. 2011-026754 filed with the Japan Patent Office on Feb. 10, 2011, the entire content of which is hereby incorporated by reference.

BACKGROUND OF THE INVENTION

Field of the Invention

The present invention relates to an image forming apparatus and a terminal device, and more particularly to an image forming apparatus and a terminal device in which operations are executed by user's "pinch-in (pinch-close)" and "pinch-out (pinch-open)" gestures on a touch panel.

Description of the Related Art

Some of image forming apparatuses, such as a copier, a printer and their compound machine, MFP (Multi-Functional Peripheral), store image data as a file, and exchange that file with another device, such as a personal digital assistant, connected through a network.

On the other hand, devices such as personal digital assistants having a touch panel are increasing, and a user interface using a touch panel is becoming widespread. As an example, Japanese Laid-Open Patent Publication No. 2002-123369, for example, proposes a technique of scrolling the contents displayed on a screen when a different operation from a usual press-down operation is performed. Japanese Laid-Open Patent Publication No. 2000-163444 discloses a technique as an electronic book having a function of providing date information for user-indicated information or user-input information for automatic storage in a file folder, wherein a range is indicated using a finger movement history in an input operation with a finger. Japanese Laid-Open Patent Publication No. 2000-163193 discloses a technique as an electronic book capable of outputting, on a display, information provided with a page number as image information on a page basis, wherein a page turn-over input and book mark insertion are performed based on a detected finger contact pressure, a contact area and a finger moving direction. Japanese Laid-Open Patent Publication No. 08-076926 discloses a technique of turning over pages based on a moving amount and a direction of finger contact movement, and changing the number of pages turned over depending on the number of touching fingers.

For example, in a situation where a plurality of apparatuses may be used in an office or the like, an apparatus intended to execute processing may differ from an apparatus intended to instruct execution of the processing. Moreover, an apparatus intended to execute processing may differ from an apparatus holding information for use in the processing.

In such a case, even when a technique as proposed in the above-mentioned pieces of literature is employed, different manipulations need to be performed on two apparatuses, respectively, and the manipulation in each apparatus needs to be performed repeatedly, which results in complicated manipulations.

SUMMARY OF THE INVENTION

The present invention was made in view of such problems, and has an object to provide an image forming apparatus and a terminal device capable of causing the devices connected through a network to execute processing therebetween with intuitive and easy manipulations.

To achieve the above-described object, according to an aspect of the present invention, an image forming apparatus includes a touch panel, a controller connected to the touch panel, a memory, and a communication device for communicating with an other device. The controller executes the processes of, continuously after two contacts are made on the touch panel, when a first gesture of moving the two contacts in a direction that a spacing therebetween is decreased and then releasing the two contacts after being moved is detected, identifying a program presented by an icon displayed in an area defined by the two contacts at least either of before and after being moved, as a program subjected to the first gesture, and storing information that identifies the program subjected to the first gesture in the memory, reading the information that identifies the program subjected to the first gesture from the memory in accordance with a command related to the program subjected to the first gesture to execute an operation related to the program subjected to the first gesture, and transmitting information depending on the operation to an other device indicated by the command.

Preferably, upon receipt of, from the other device, a report that continuously after two contacts are made on the touch panel, a second gesture of moving the two contacts in a direction that a spacing therebetween is increased and then releasing the two contacts after being moved has been detected as well as information that identifies a program subjected to the second gesture, the controller further executes the process of determining an operation to be executed by the image forming apparatus based on the program subjected to the first gesture and the program subjected to the second gesture, the program subjected to the second gesture being a program being executed when the second gesture has been detected.

More preferably, the controller previously stores an operation to be executed by the image forming apparatus in association with a combination of programs, and reads an operation associated with the program subjected to the first gesture and the program subjected to the second gesture, thereby determining the operation to be executed by the image forming apparatus.

Preferably, the controller further executes a login process of performing user authentication using user information. The information that identifies the program subjected to the first gesture includes the user information. The information that identifies the program subjected to the second gesture includes information that identifies a login user when the program subjected to the second gesture has been executed in the other device. The controller determines the operation when the user information included in the program subjected to the first gesture indicates the login user when the program subjected to the second gesture has been executed.

Preferably, the controller further executes the process of, when the first gesture is detected, reporting to that effect to a server previously defined using the communication device, and transmitting the information that identifies the program subjected to the first gesture to the server. The command is transmitted from the server.

More preferably, the controller further executes the processes of continuously after two contacts are made on the touch panel, when a second gesture of moving the two contacts in a direction that a spacing therebetween is increased and then releasing the two contacts after being moved is detected, identifying the program being executed when the second gesture has been detected as a program subjected to the second gesture, and when the second gesture is detected, reporting to that effect to the server using the communication device, and transmitting information that identifies the program subjected to the second gesture to the server.

Preferably, the controller further executes a login process of performing user authentication using user information. The information that identifies the program subjected to the first gesture includes the user information. In the process of storing the information that identifies the program subjected to the first gesture in the memory, the information that identifies the program subjected to the first gesture including the user information is overwritten.

Preferably, the controller further executes the process of transmitting a command for causing information in accordance with the operation to be processed, to the other device.

According to another aspect of the present invention, an image forming apparatus includes a touch panel, a controller connected to the touch panel, and a communication device for communicating with an other device. The controller executes the processes of, continuously after two contacts are made on the touch panel, when a gesture of moving the two contacts in a direction that a spacing therebetween is increased and then releasing the two contacts after being moved is detected, identifying a program being executed when the gesture has been detected as a program subjected to the gesture, when the gesture is detected, reporting to that effect to a server previously defined using the communication device, and transmitting information that identifies the program subjected to the gesture to the server, and executing a program related to the program subjected to the gesture, and by executing the program related to the program subjected to the gesture, the controller processes information related to an operation received from a terminal device having executed the operation in accordance with a command from the server.

According to still another aspect of the present invention, a terminal device includes a touch panel, a controller connected to the touch panel, a memory, and a communication device for communicating with an other device. The controller further executes the processes of, continuously after two contacts are made on the touch panel, when a first gesture of moving the two contacts in a direction that a spacing therebetween is decreased and then releasing the two contacts after being moved is detected, identifying a program presented by an icon displayed in an area defined by the two contacts at least either of before and after being moved, as a program subjected to the first gesture, and storing information that identifies the program subjected to the first gesture in the memory, reading the information that identifies the program subjected to the first gesture from the memory in accordance with a command related to the program subjected to the first gesture to execute an operation related to the program subjected to the first gesture, and transmitting information depending on the operation to an image forming apparatus indicated by the command.

Preferably, upon receipt of, from the image forming apparatus, a report that continuously after two contacts are made on a touch panel included in the image forming apparatus, a second gesture of moving the two contacts in a direction that a spacing therebetween is increased and then releasing the two contacts after being moved has been detected and information that identifies a program subjected to the second gesture, the controller further executes the process of determining an operation to be executed by the terminal device based on the program subjected to the first gesture and the program subjected to the second gesture, the program subjected to the second gesture being a program being executed when the second gesture has been detected.

According to a further aspect of the present invention, a terminal device includes a touch panel, a controller connected to the touch panel, and a communication device for communicating with an other device. The controller executes the processes of, continuously after two contacts are made on the touch panel, when a gesture of moving the two contacts in a direction that a spacing therebetween is increased and then releasing the two contacts after being moved is detected, identifying a program being executed when the gesture has been detected as a program subjected to the gesture, when the gesture is detected, reporting to that effect to a server previously defined using the communication device, and transmitting information that identifies the program subjected to the gesture to the server, and executing a program related to the program subjected to the gesture. By executing the program related to the program subjected to the gesture, the controller processes information related to an operation received from an image forming apparatus having executed the operation in accordance with a command from the server.

According to a still further aspect of the present invention, an image forming system includes an image forming apparatus, a terminal device, and a server. The image forming apparatus and the terminal device each include a touch panel, a controller connected to the touch panel, and a memory. One of the image forming apparatus and the terminal device is represented by a first device, and the other one is represented by a second device. The controller of the first device executes the processes of continuously after two contacts are made on the touch panel, when a first gesture of moving the two contacts in a direction that a spacing therebetween is decreased and then releasing the two contacts after being moved is detected, identifying a program presented by an icon displayed in an area defined by the two contacts at least either of before and after being moved, as a program subjected to the first gesture, and storing information that identifies the program subjected to the first gesture in the memory, when the first gesture is detected, reporting to that effect to the server, and transmitting the information that identifies the program subjected to the first gesture to the server, continuously after two contacts are made on the touch panel, when a second gesture of moving the two contacts in a direction that a spacing therebetween is increased and then releasing the two contacts after being moved is detected, identifying a program being executed when the second gesture has been detected as a program subjected to the second gesture, when the second gesture is detected, reporting to that effect to the server, and transmitting information that identifies the program subjected to the second gesture to the server, reading the information that identifies the program subjected to the first gesture from the memory in accordance with a command transmitted from the server to execute an operation related to the program subjected to the first gesture, and transmitting information depending on the operation to the second device indicated by the command, and executing a program related to the program subjected to the second gesture. The controller of the second device executes the processes of continuously after two contacts are made on the touch panel, when a third gesture of moving the two contacts in a direction that a spacing therebetween is decreased and then releasing the two contacts after being moved is detected, identifying a program presented by an icon displayed in an area defined by the two contacts at least either of before and after being moved, as a program subjected to the third gesture, and storing information that identifies the program subjected to the third gesture in the memory, when the third gesture is detected, reporting to that effect to the server, and transmitting the information that identifies the program subjected to the third gesture to the server, continuously after two contacts are made on the touch panel, when a fourth gesture of moving the two contacts in a direction that a spacing therebetween is increased and then releasing the two contacts after being moved is detected, identifying the program being executed when the fourth gesture has been detected as a program subjected to the fourth gesture, when the fourth gesture is detected, reporting to that effect to the server, and transmitting information that identifies the program subjected to the fourth gesture to the server, reading the information that identifies the program subjected to the third gesture from the memory in accordance with a command transmitted from the server to execute an operation related to the program subjected to the third gesture, and transmitting information depending on the operation to the first device indicated by the command, and executing a program related to the program subjected to the fourth gesture. The server executes the processes of, upon receipt of, from the first device, a report that the first gesture has been detected, storing the information that identifies the program subjected to the first gesture, upon receipt of, from the second device, a report that the third gesture has been detected, storing the information that identifies the program subjected to the third gesture, upon receipt of, from the first device, a report that the second gesture has been detected and the information that identifies the program subjected to the second gesture, reading the information that identifies the program subjected to the third gesture to determine an operation to be executed by the second device based on the program subjected to the second gesture and the program subjected to the third gesture, and upon receipt of, from the second device, a report that the fourth gesture has been detected and the information that identifies the program subjected to the fourth gesture, reading the information that identifies the program subjected to the first gesture to determine an operation to be executed by the first device based on the program subjected to the first gesture and the program subjected to the fourth gesture.

According to a further aspect of the present invention, a non-transitory computer-readable storage medium has recorded thereon a control program for causing an image processing apparatus having a touch panel, a controller connected to the touch panel, and a memory to execute a process. The program instructs the controller to perform the following steps of continuously after two contacts are made on the touch panel, detecting a gesture of moving the two contacts in a direction that a spacing therebetween is decreased and then releasing the two contacts after being moved, when the gesture is detected, identifying a program presented by an icon displayed in an area defined by the two contacts at least either of before and after being moved, as a program subjected to the gesture, storing information that identifies the program subjected to the gesture in the memory, when the gesture is detected, reporting to that effect to a server previously defined, and transmitting the information that identifies the program subjected to the gesture to the server, and upon receipt of a command transmitted from the server, reading the information that identifies the program subjected to the gesture from the memory in accordance with the command to execute an operation related to the program subjected to the gesture, and transmitting information depending on the operation to an other device indicated by the command.

According to a still further aspect of the present invention, a non-transitory computer-readable storage medium has recorded thereon a control program for causing a terminal device having a touch panel, a controller connected to the touch panel, and a memory to execute a process. The program instructs the controller to perform the following steps of, continuously after two contacts are made on the touch panel, detecting a gesture of moving the two contacts in a direction that a spacing therebetween is increased and then releasing the two contacts after being moved, when the gesture is detected, identifying a program being executed when the gesture has been detected as a program subjected to the gesture, when the gesture is detected, reporting to that effect to a server previously defined, and transmitting information that identifies the program subjected to the gesture to the server, and upon receipt of information related to an operation from an other device having executed the operation in accordance with a command from the server, executing a program related to the program subjected to the gesture, thereby processing the information received from the other device.

According to a further aspect of the present invention, a non-transitory computer-readable storage medium has recorded thereon a control program for causing a server to execute a process, the server previously storing an operation to be executed by a first device in association with a combination of programs. The program instructs a controller of the server to perform the following steps of, upon receipt of, from the first device, a report that continuously after two contacts are made on a touch panel included in the first device, a first gesture of moving the two contacts in a direction that a spacing therebetween is decreased and then releasing the two contacts after being moved is detected as well as information that identifies a program subjected to the first gesture, storing the information in a memory, a program presented by an icon displayed in an area defined by the two contacts at least either of before and after being moved being identified as the program subjected to the first gesture, upon receipt of, from a second device, a report that continuously after two contacts are made on the touch panel, a second gesture of moving the two contacts in a direction that a spacing therebetween is increased and then releasing the two contacts after being moved is detected as well as information that identifies a program subjected to the second gesture, determining an operation to be executed by the first device based on the program subjected to the first gesture and the program subjected to the second gesture, the program subjected to the second gesture being a program being executed when the second gesture has been detected, and transmitting a command for causing the operation to be executed by the first device, to the first device.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
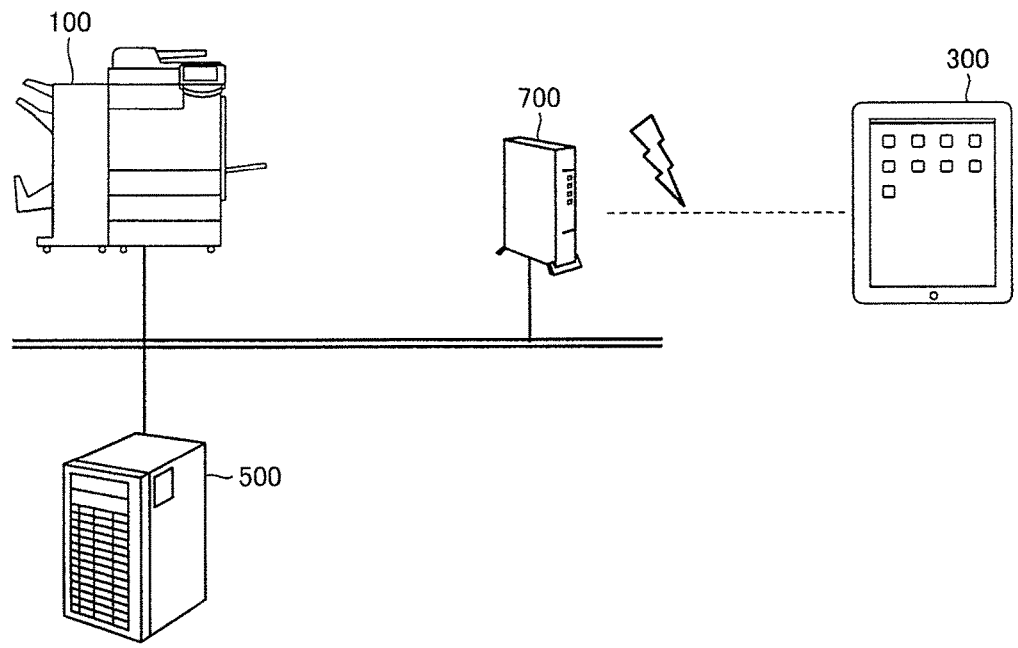
FIG. 1 shows a specific example of a configuration of an image forming system according to an embodiment.

Hereinafter, embodiments of the present invention will be described with reference to the drawings. In the following description, like parts and components are denoted by like reference characters. They are named and function identically as well.

<System Configuration>

FIG. 1 shows a specific example of a configuration of an image forming system according to the present embodiment.

Referring to FIG. 1, the image forming system according to the present embodiment includes an MFP (Multi-Functional Peripheral) 100 as an example of an image forming apparatus, a portable terminal 300 as a terminal device, and a server 500. They are connected through a network, such as LAN (Local Area Network).

The network may be wired or may be wireless. As an example, as shown in FIG. 1, MFP 100 and server 500 are connected to a wired LAN, the wired LAN further including a wireless LAN access point 700, and portable terminal 300 is connected to wireless LAN access point 700 through the wireless LAN.

The image forming apparatus is not limited to MFP, but may be any image forming apparatus that has a touch panel as a structure for receiving an operation input. As another example, the image forming apparatus may be a copier, a printer, a facsimile machine, or the like.

Portable terminal 300 may be any device that has a touch panel as a structure for receiving an operation input. For example, the portable terminal may be a cellular phone, a personal computer, or PDA (Personal Digital Assistant) each having a touch panel, or may be an image forming apparatus such as MFP.

<Configuration of MFP>

Figure 2:
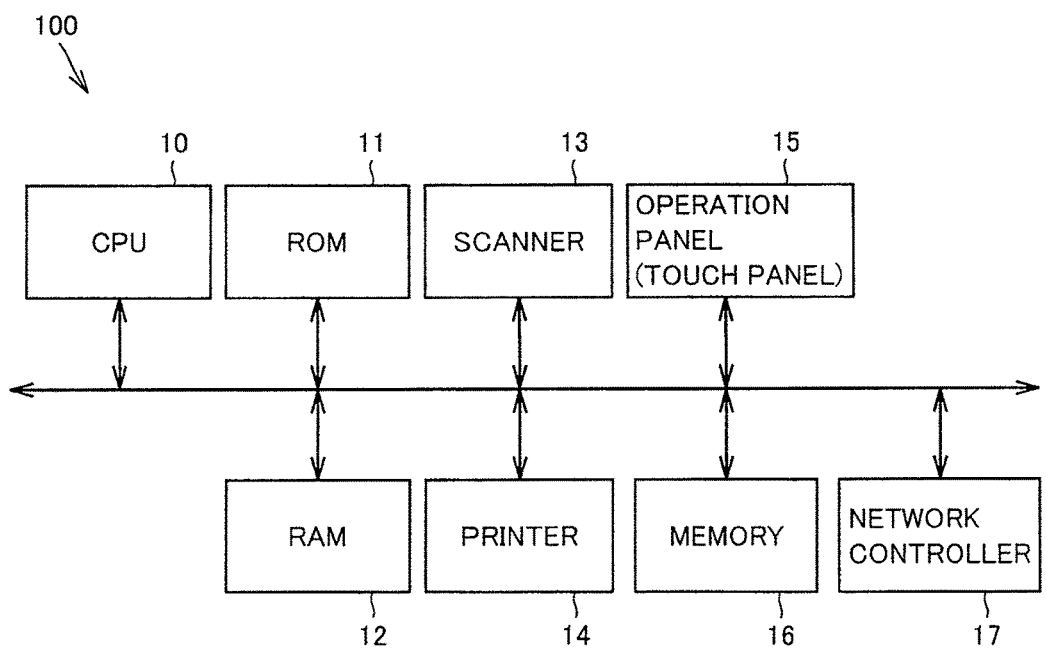
FIG. 2 shows a specific example of a hardware configuration of MFP (Multi-Functional Peripheral) included in the image forming system.

FIG. 2 shows a specific example of a hardware configuration of MFP 100.

Referring to FIG. 2, MFP 100 includes a CPU (Central Processing Unit) 10 as an arithmetic device for overall control, a ROM (Read Only Memory) 11 for storing programs and the like to be executed by CPU 10, a RAM (Random Access Memory) 12 for functioning as a working area during execution of a program by CPU 10, a scanner 13 for optically reading a document placed on a document table not shown to obtain image data, a printer 14 for fixing image data on a printing paper, an operation panel 15 including a touch panel for displaying information and receiving an operation input to MFP 100 concerned, a memory 16 for storing image data as a file, and a network controller 17 for controlling communications through the above-described network.

Operation panel 15 includes the touch panel and an operation key group not shown. The touch panel is composed of a display device such as a liquid crystal display and a pointing device such as an optical touch panel or a capacitance touch panel, the display device and the pointing device overlapping each other, and displays an operation screen so that an indicated position on the operation screen is identified. CPU 10 causes the touch panel to display the operation screen based on data stored previously for causing screen display.

The indicated position (position of touch) on the touch panel as identified and an operation signal indicating a pressed key are input to CPU 10. CPU 10 identifies details of manipulation based on the pressed key or the operation screen being displayed and the indicated position, and executes a process based thereon.

<Configuration of Portable Terminal>

Figure 3:
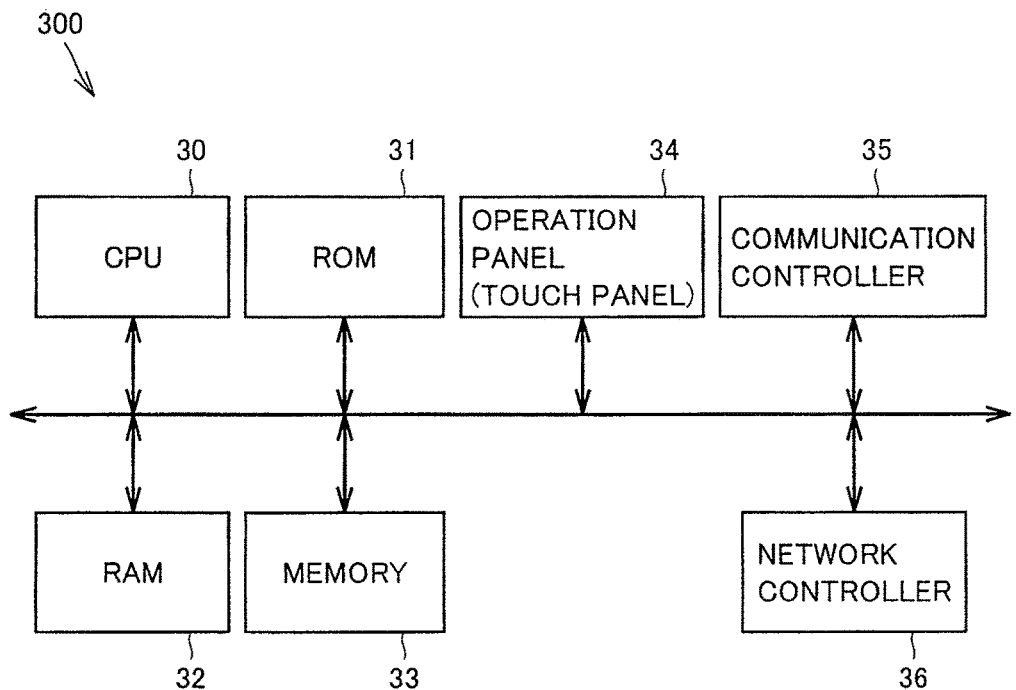
FIG. 3 shows a specific example of a hardware configuration of a portable terminal included in the image forming system.

FIG. 3 shows a specific example of a hardware configuration of portable terminal 300.

Referring to FIG. 3, portable terminal 300 includes a CPU 30 as an arithmetic device for overall control, a ROM 31 for storing programs and the like to be executed by CPU 30, a RAM 32 for functioning as a working area during execution of a program by CPU 30, a memory 33 for storing image data as a file or storing another type of information, an operation panel 34 including a touch panel for displaying information and receiving an operation input to portable terminal 300 concerned, a communication controller 35 for controlling communications through telephone lines by communicating with a base station not shown, and a network controller 36 for controlling communications through the above-described network.

Operation panel 34 may have a configuration similar to that of operation panel 15 of MFP 100. That is, as an example, operation panel 34 includes a touch panel composed of a display device such as a liquid crystal display and a pointing device such as an optical touch panel or a capacitance touch panel, the display device and the pointing device overlapping each other.

CPU 30 causes the touch panel to display an operation screen based on data stored previously for causing screen display. On the touch panel, the indicated position on the operation screen is identified, and an operation signal indicating that position is input to CPU 30. CPU 30 identifies details of manipulation based on the operation screen being displayed and the indicated position, and executes a process based thereon.

<Configuration of Server>

Figure 4:
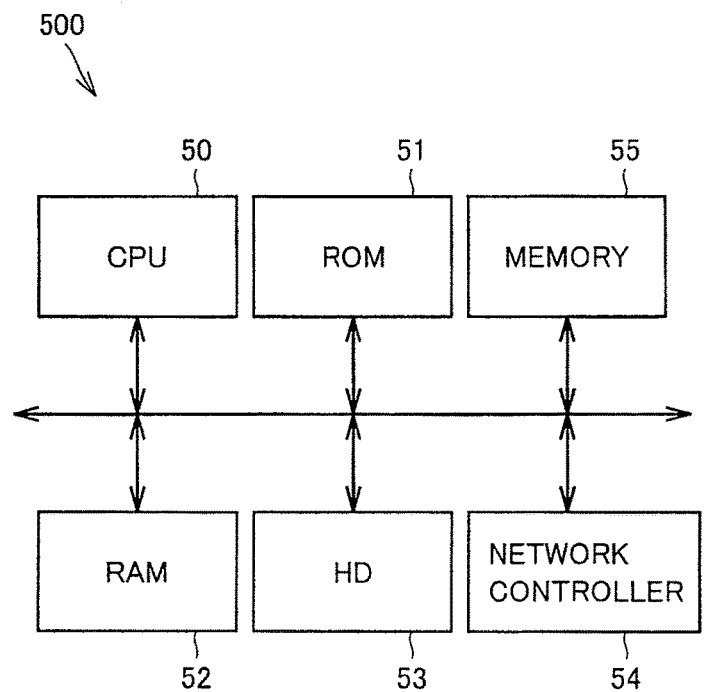
FIG. 4 shows a specific example of a hardware configuration of a server included in the image forming system.

FIG. 4 shows a specific example of a hardware configuration of server 500.

Referring to FIG. 4, server 500 is implemented by a typical computer or the like as described above, and as an example, includes a CPU 50 as an arithmetic device for overall control, a ROM 51 for storing programs and the like to be executed by CPU 50, a RAM 52 for functioning as a working area during execution of a program by CPU 50, a HD (Hard Disk) 53 for storing files and the like, and a network controller 54 for controlling communications through the above-described network.

<Outline of Operations>

Figure 5:
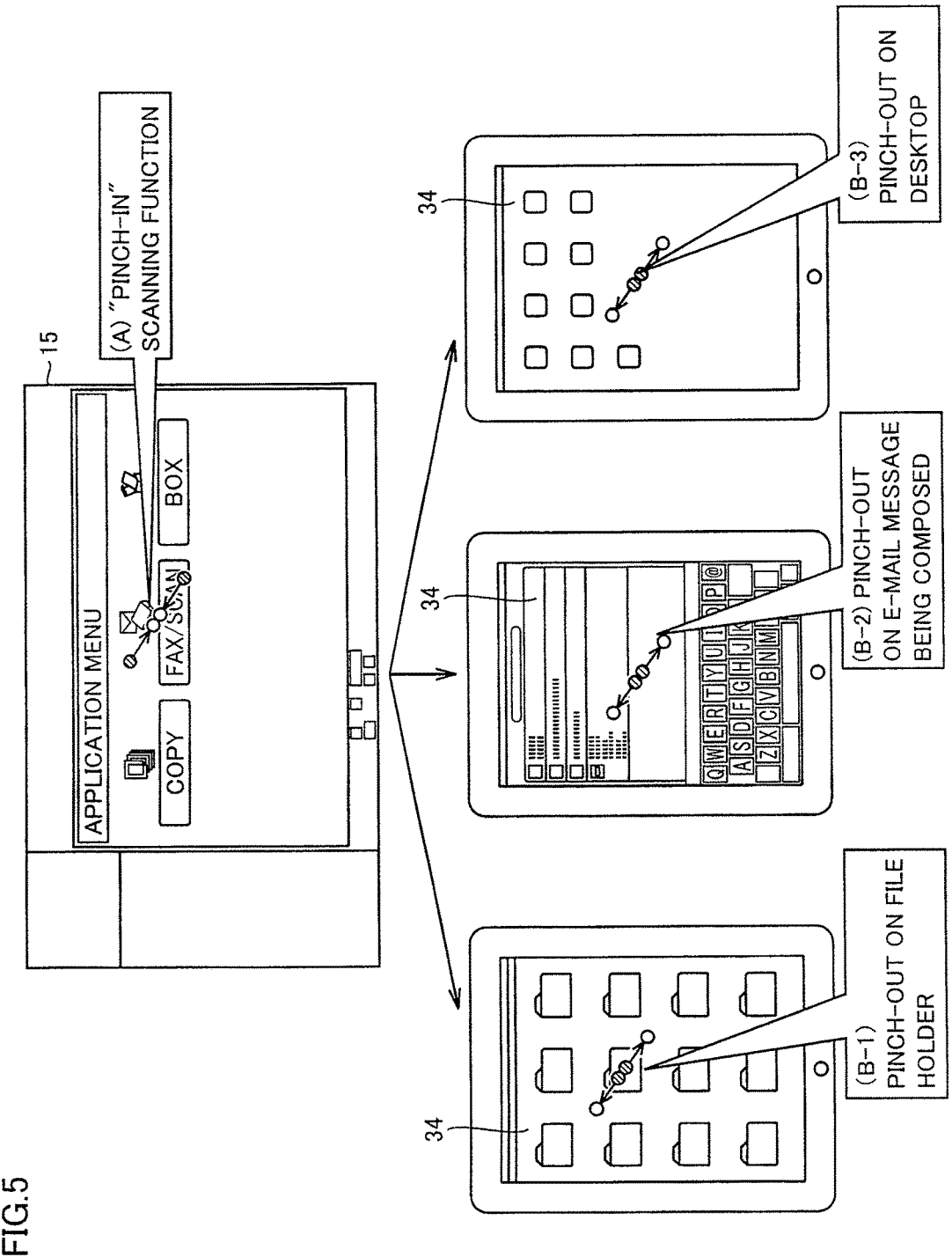
FIG. 5 illustrates a first specific example of gestures in the image forming system.

In the image forming system, MFP 100 executes a process identified in accordance with an application when a pinch-in gesture has been performed in MFP 100 and an application when a pinch-out gesture has been performed in portable terminal 300 as another device, and information is transmitted from MFP 100 to portable terminal 300. FIG. 5 illustrates a first specific example of gestures in the image forming system according to the present embodiment.

Referring to FIG. 5, in the first example, a user logs in to MFP 100, and opens an application menu screen as a screen for making a selection of an application mounted on MFP 100. FIG. 5 shows at (A) an example in which the application menu screen is displayed on operation panel 15. A "pinch-in" gesture as shown at (A) in FIG. 5 is performed on an icon presenting an application being displayed there.

Thereafter, the user causes an application in accordance with information transmitted from his/her own portable terminal 300 to be executed. FIG. 5 shows at (B-1) an example in which an application for presenting files stored in portable terminal 300 in a manner that a selection can be made, and a file list screen is displayed on operation panel 34. FIG. 5 shows at (B-2) an example in which an e-mail transmission application is executed, and an e-mail transmission screen is displayed on operation panel 34. FIG. 5 shows at (B-3) an example in which a standby application for awaiting processing is executed, and a standby screen is displayed on operation panel 34.

Then, by performing "pinch-out" gestures on operation panel 34 as shown at (B-1) to (B-3) in FIG. 5, a process identified in accordance with an application corresponding to an icon indicated by a pinch-in gesture and an application being executed when a pinch-out gesture has been performed is performed in MFP 100, and predetermined information is transmitted from MFP 100 to portable terminal 300.

As a specific example, with a "pinch-in" gesture performed on an icon corresponding to an application for causing facsimile transmission and scanning to be executed as displayed on the application menu screen on operation panel 15, and subsequently with a "pinch-out" gesture performed on the file list screen displayed on operation panel 34 shown at (B-1) in FIG. 5, a scanning operation is executed in MFP 100, and obtained image data is transmitted from MFP 100 to portable terminal 300 and is stored in a folder on which the "pinch-out" gesture has been performed. This example will also be referred to as a first example in the following description.

Similarly, with a "pinch-out" gesture performed on the mail transmission screen displayed on operation panel 34 shown at (B-2) in FIG. 5, a scanning operation is executed in MFP 100, and obtained image data is transmitted from MFP 100 to portable terminal 300 to be attached to an e-mail message being composed on which the "pinch-out" gesture has been performed as attached data. This example will also be referred to as a second example in the following description.

Similarly, with a "pinch-out" gesture performed on the standby screen displayed on operation panel 34 shown at (B-3) in FIG. 5, an application, such as TWAIN, for achieving a user interface that allows image data obtained by scanning in MFP 100 to be input in portable terminal 300 is transmitted from MFP 100 to portable terminal 300, and is installed in portable terminal 300 as a scanner application. This example will also be referred to as a third example in the following description.

Figure 6:
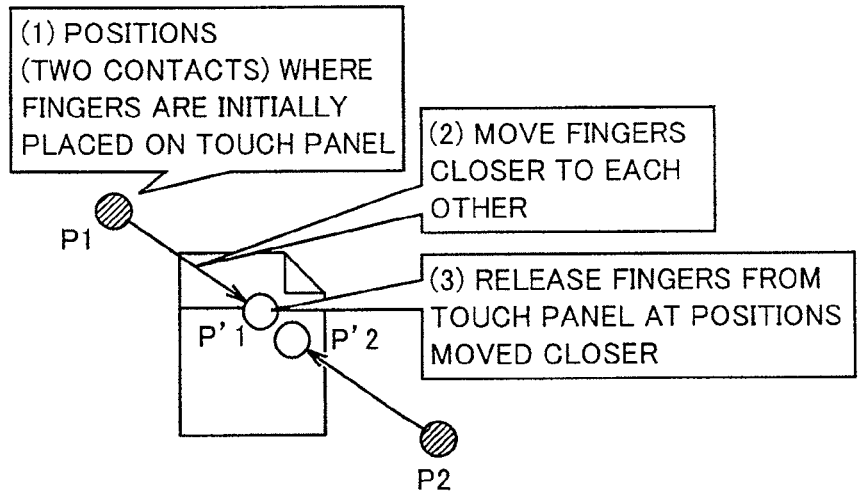
FIG. 6 illustrates a "pinch-in" gesture.

FIG. 6 illustrates a "pinch-in" gesture. Referring to FIG. 6, the "pinch-in" or pinching gesture refers to a motion of making two contacts P1 and P2 on operation panel 15 using, for example, two fingers or the like, and then moving the fingers closer to each other from their initial positions linearly or substantially linearly, and releasing the two fingers from operation panel 15 at two contacts P'1 and P'2 moved closer.

When it is detected that two contacts P1 and P2 on operation panel 15 have been made simultaneously, and further, the respective contacts have been continuously displaced from their initial positions linearly or substantially linearly, and both the contacts have been released almost simultaneously at two contacts P'1 and P'2 positioned at a spacing narrower than the spacing between their initial positions, CPU 10 detects that the "pinch-in" gesture has been performed.

Figure 7:
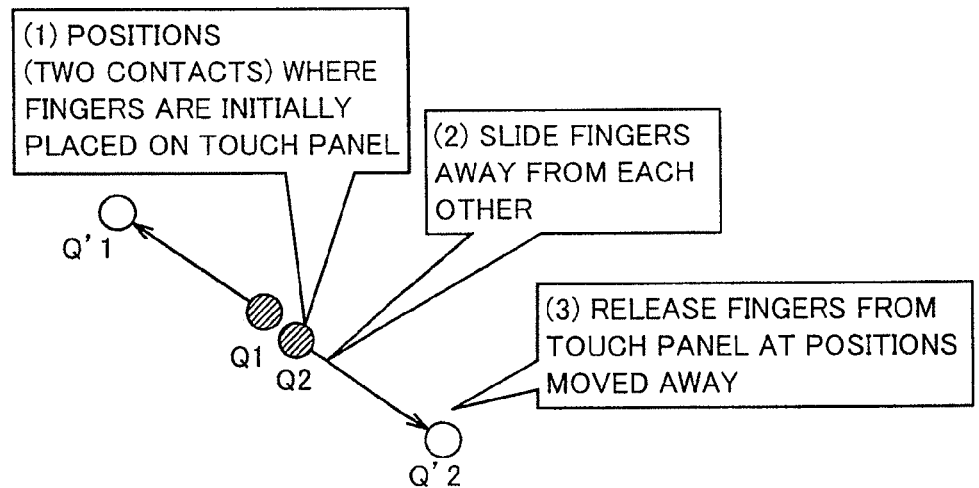
FIG. 7 illustrates a "pinch-out" gesture.

FIG. 7 illustrates a "pinch-out" gesture. Referring to FIG. 7, the "pinch-out" or anti-pinching gesture refers to a motion of making two contacts Q1 and Q2 on operation panel 34 using, for example, two fingers or the like, and then moving the fingers away from their initial positions linearly or substantially linearly, and releasing the two fingers from operation panel 34 at two contacts Q'1 and Q'2 moved away to some degree.

When it is detected that two contacts Q1 and Q2 on operation panel 34 have been made simultaneously, and further, the respective contacts have been continuously displaced from their initial positions linearly or substantially linearly, and both the contacts have been released almost simultaneously at two contacts Q'1 and Q'2 positioned at a spacing wider than the spacing between their initial positions, CPU 30 detects that the "pinch-out" or de-pinching gesture has been performed.

Figure 8:
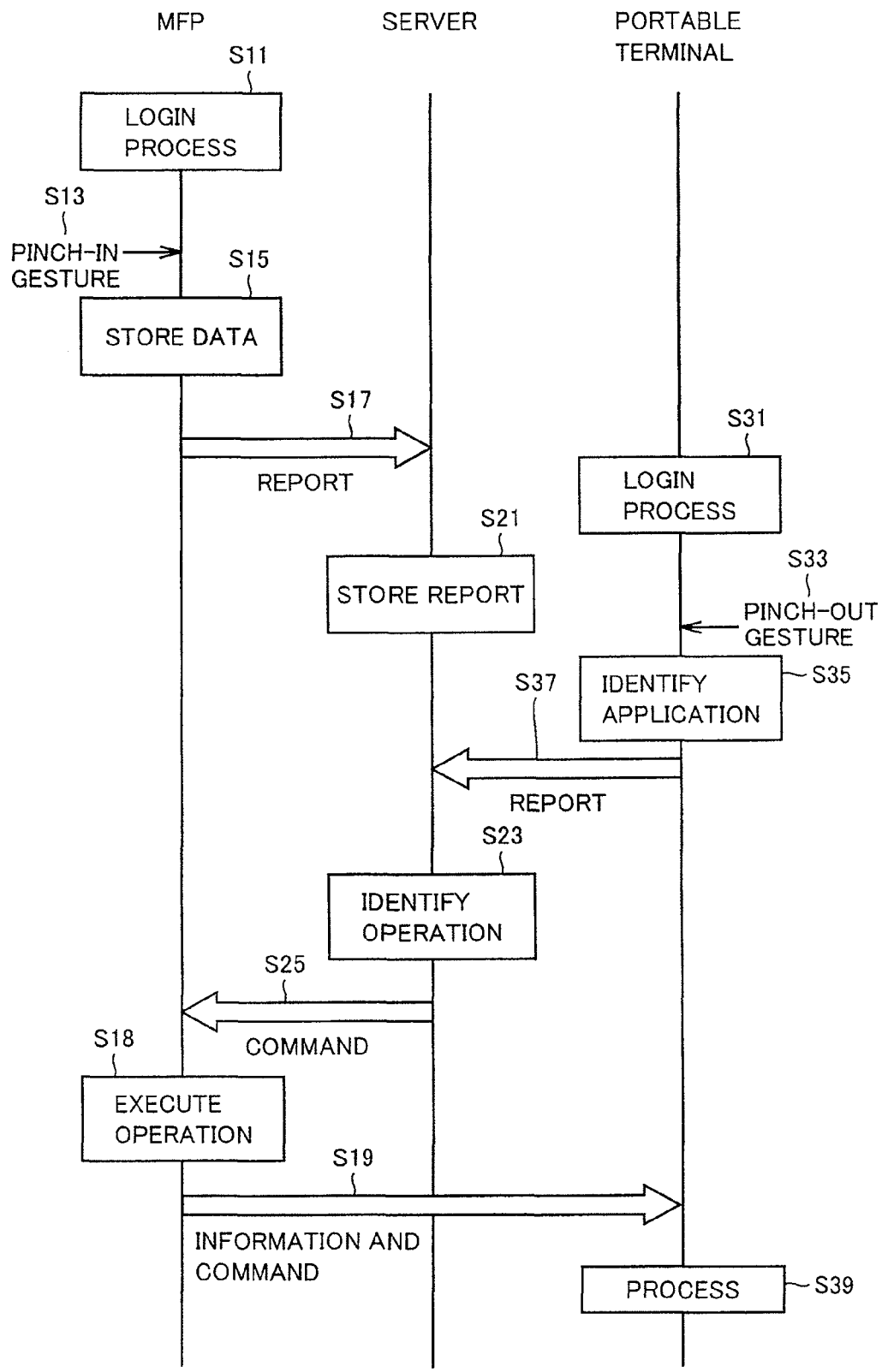
FIG. 8 is a sequence diagram showing the flow of operations in the image forming system.

FIG. 8 is a sequence diagram showing the flow of operations in the image forming system.

Referring to FIG. 8, in Step S11, a login process is performed in MFP 100, and user authentication is carried out. Then, when a pinch-in gesture is detected in Step S13, information identified by the pinch-in gesture is stored in Step S15. The information identified by the pinch-in gesture at least includes information that identifies an application presented by an icon on which the pinch-in gesture has been performed. As other types of information, information that identifies the date and time when the pinch-in gesture is detected, information that identifies a login user when the pinch-in gesture is detected, and the like are included. These pieces of information related to the pinch-in gesture will be also referred to as "pinch-in information" in the following description.

MFP 100 previously stores server 500 as a report destination, and in Step S17, reports to server 500 that the pinch-in gesture has been performed on operation panel 15. At this time, the pinch-in information stored in Step S15 is transmitted to server 500.

In Step S31, a login process is performed in portable terminal 300, and user authentication is carried out. Then, when a pinch-out gesture is detected in Step S33, an application being executed when the pinch-out gesture has been performed is identified in Step S35. Additionally, information that identifies the date and time when the pinch-out gesture is detected, information that identifies a login user when the pinch-out gesture is detected, and the like may be identified. These pieces of information related to the pinch-out gesture will be also referred to as "pinch-out information" in the following description.

Portable terminal 300 previously stores server 500 as a report destination, and in Step S37, reports to server 500 that the pinch-out gesture has been performed in Step S33. At this time, the pinch-out information identified in Step S35 is also reported to server 500.

Server 500 previously stores an operation to be executed by MFP 100 in association with a combination of an application presented by an icon on which the pinch-in gesture has been performed and an application being executed in portable terminal 300 when the pinch-out gesture has been performed. Therefore, server 500 in Step S23 identifies an operation to be executed by MFP 100 based on the details of report in Step S17 and the details of report in Step S37. Then, in Step S25, server 500 transmits a command for causing MFP 100 to execute that operation, to MFP 100.

In the above-described first example, for example, the above-described command includes a command for causing MFP 100 to execute a scanning operation and causing obtained image data to be transmitted to portable terminal 300 together with a command for causing the image data to be stored in a folder on which the "pinch-out" gesture has been performed.

In the above-described second example, for example, a command for causing MFP 100 to execute a scanning operation and causing obtained image data to be transmitted to portable terminal 300 together with a command for causing the image data to be attached to an e-mail message being composed as attached data applies.

In the above-described third example, for example, a command for causing MFP 100 to transmit an application previously stored in MFP 100 as an application for achieving a user interface that allows an image obtained by scanning in MFP 100 to be input, to portable terminal 300 together with a command for causing the application to be installed applies.

MFP 100 having received that command executes an operation in accordance with that command in Step S18. By that operation, in Step S19, related information and a command for causing portable terminal 300 to process that information are transmitted from MFP 100 to portable terminal 300, and in Step S39, the information is processed in portable terminal 300 in accordance with that command.

<Functional Configuration>

The functional configuration of each device for implementing the operations as shown in FIG. 8 in the image forming system according to the present embodiment will be described.

Figure 9:
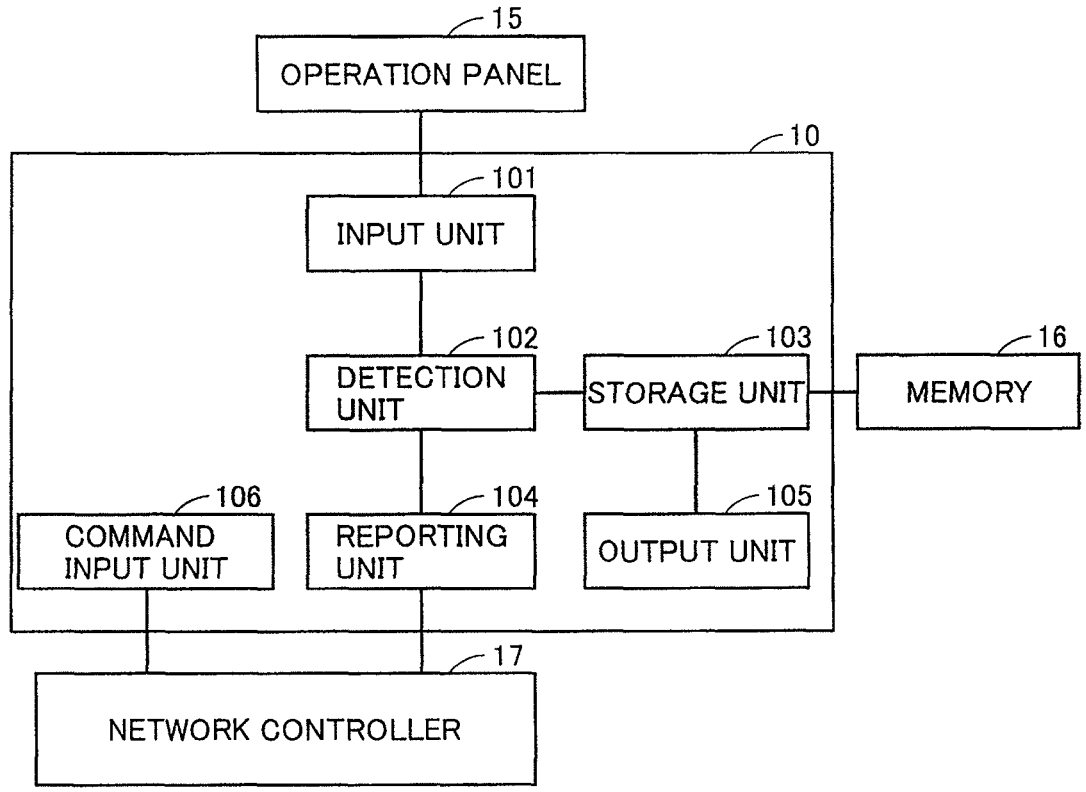
FIG. 9 is a block diagram showing a specific example of a functional configuration of MFP.

FIG. 9 is a block diagram showing a specific example of a functional configuration of MFP 100. Each function shown in FIG. 9 is a function mainly configured in CPU 10 by CPU 10 reading a program stored in ROM 11 and executing the program on RAM 12. However, at least some functions may be configured by the hardware configuration shown in FIG. 2.

Referring to FIG. 9, as functions for achieving the above-described operations, MFP 100 includes an input unit 101 for receiving input of an operation signal indicating an instruction on operation panel 15, a detection unit 102 for detecting the above-described pinch-in gesture based on the operation signal, a storage unit 103 for executing a process of storing, in a predetermined area of memory 16, pinch-in information, such as information that identifies an application presented by an icon indicated by the pinch-in gesture based on the indicated position presented by the operation signal, information that identifies the date and time when the pinch-in gesture is detected, information that identifies a login user when the pinch-in gesture is detected, and the like, a reporting unit 104 in which server 500 is stored as a report destination and for executing a process of transmitting pinch-in information to server 500 through network controller 17 and reporting that the pinch-in gesture has been performed, an output unit 105 for outputting identified pinch-in information among pieces of pinch-in information stored in the predetermined area of memory 16 in accordance with the command from server 500 and executing an indicated process, and a command input unit 106 for receiving input of the above-described command from server 500 through network controller 17.

Storage unit 103 identifies an icon, displayed in an area defined based on at least either two contacts (two contacts P1, P2 in FIG. 6) indicated initially in the pinch-in gesture or two contacts (two contacts P'1, P'2 in FIG. 6) indicated finally, as an icon indicated by the pinch-in gesture.

The method of identifying an icon indicated by the pinch-in gesture in storage unit 103 is not limited to a certain method. FIGS. 10 to 14 each illustrate a specific example of a method of identifying an icon indicated by the pinch-in gesture in storage unit 103.

Figure 10:
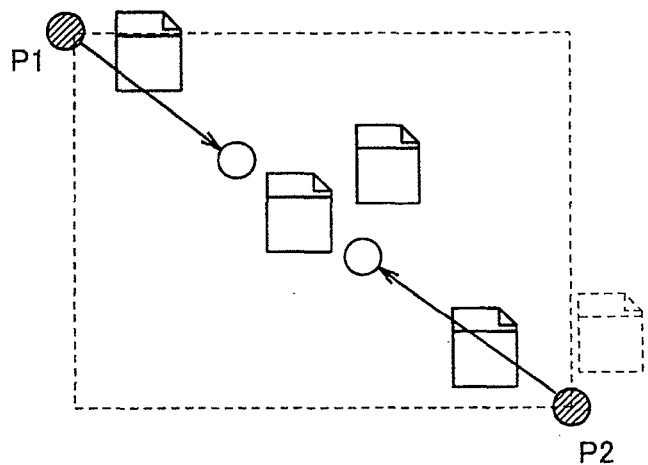
FIGS. 10 to 14 each illustrate a specific example of a method of identifying an icon indicated by the pinch-in gesture.
Figure 11:
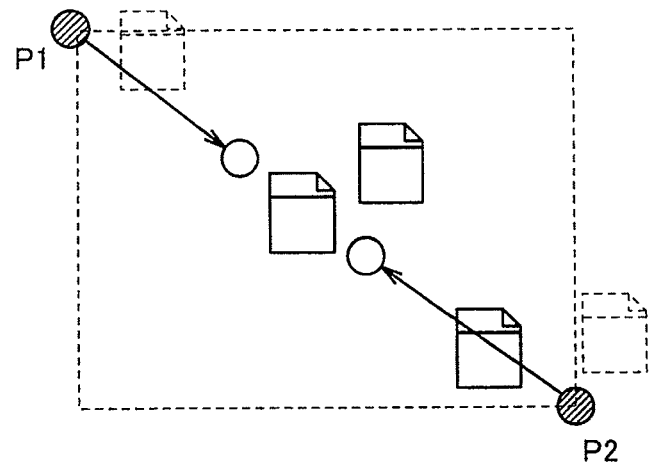

As an example, as shown in FIG. 10, storage unit 103 may identify a rectangle in which two contacts P1 and P2 indicated initially are at opposite corners as an area defined by the pinch-in gesture, and may identify icons, each of which is at least partially included in that rectangle, may be identified as indicated icons. Alternatively, as shown in FIG. 11, a rectangle in which two contacts P1 and P2 indicated initially are at opposite corners may be identified as an area defined by the pinch-in gesture, and icons completely included in that rectangle may be identified as indicated icons. With such identification, the user can indicate an intended icon in an intuitive manner by touching operation panel 15 with two fingers so as to sandwich the intended icon, and performing a motion for the pinch-in gesture from that state. Even when an icon image is small, it can be indicated correctly.

Figure 12:
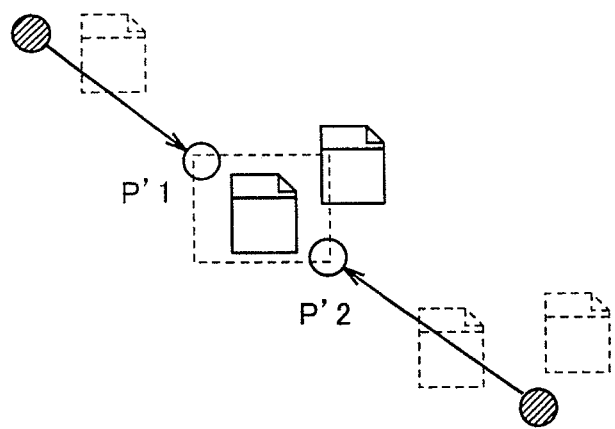
Figure 13:
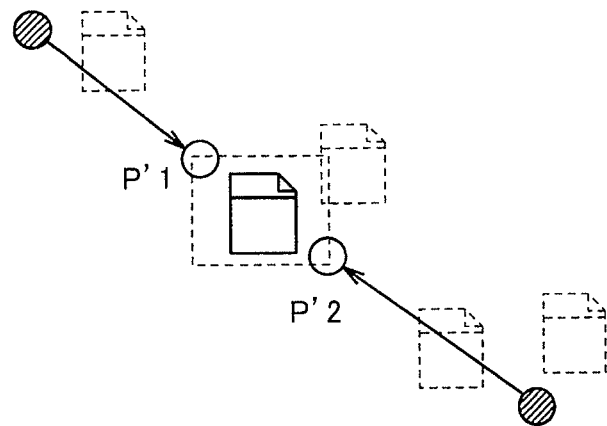

As another example, as shown in FIG. 12, storage unit 103 may identify a rectangle in which two contacts P'1 and P'2 indicated finally are at opposite corners as an area defined by the pinch-in gesture, and may identify icons, each of which is at least partially included in that rectangle, may be identified as indicated icons. Alternatively, as shown in FIG. 13, a rectangle in which two contacts P'1 and P'2 indicated finally are at opposite corners may be identified as an area defined by the pinch-in gesture, and an icon completely included in that rectangle may be identified as an indicated icon. With such identification, the user can indicate an intended icon in an intuitive manner by touching operation panel 15 with two fingers spaced apart, and then moving them closer to each other so that the intended icon is sandwiched finally between the two fingers. Even when an icon image is small, it can be indicated correctly.

Figure 14:
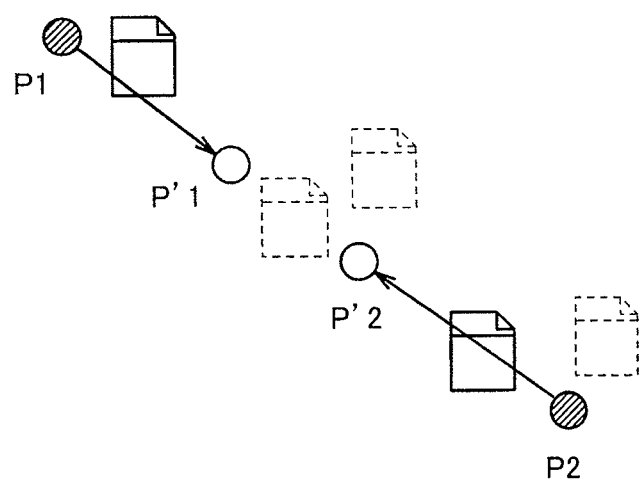

As still another example, as shown in FIG. 14, storage unit 103 may identify two lines that connect two contacts P1, P2 indicated initially and two contacts P'1, P'2 indicated finally, respectively, as areas defined by the pinch-in gesture, and may identify icons where either one line overlaps as indicated icons. With such identification, the user can indicate an intended icon in an intuitive manner by moving the two fingers so as to pinch in the intended icon. Even when an icon image is small, it can be indicated correctly.

Storage unit 103 temporarily stores pinch-in information related to the pinch-in gesture in a predetermined area of memory 106. This "temporary" period is previously set at 24 hours, for example, and when there is no command, which will be described later, input from server 500 after the lapse of that period, the pinch-in information may be deleted from the predetermined area of memory 106. Further, when there is no command input within the above-described temporary period, CPU 10 may cause operation panel 15 to display a warning reading that no command has been input, instead of or in addition to deletion from the predetermined area of memory 106, or may transmit a message to that effect to portable terminal 300 stored in correspondence with the user associated with the pinch-in information.

As another example of deleting pinch-in information, storage unit 103 may delete the pinch-in information from the predetermined area of memory 106 by detecting a pinch-in gesture again on a folder in which the icon indicated has been displayed, instead of the case when there is no command input within the above-described temporary period or in addition to the case when there is no command input.

It is to be noted that, although not shown in FIG. 9, MFP 100 further includes the function for previously storing user information, receiving, at input unit 101, input of an operation signal based on a login operation on operation panel 15, and performing user authentication based on that operation signal and user information. Storage unit 103 stores information that identifies the login user as pinch-in information in a predetermined area of memory 106.

The command from server 500 may include information that identifies the user, such as the user name and login information of portable terminal 300 as well as identification information specific to portable terminal 300, as will be described later. In that case, output unit 105 previously stores the login information or the above-described information that identifies the user, and authenticates whether or not the user identified by information included in the command matches the user identified by pinch-in information, and when a match occurs, executes a process in accordance with the command using that pinch-in information.

Figure 15:
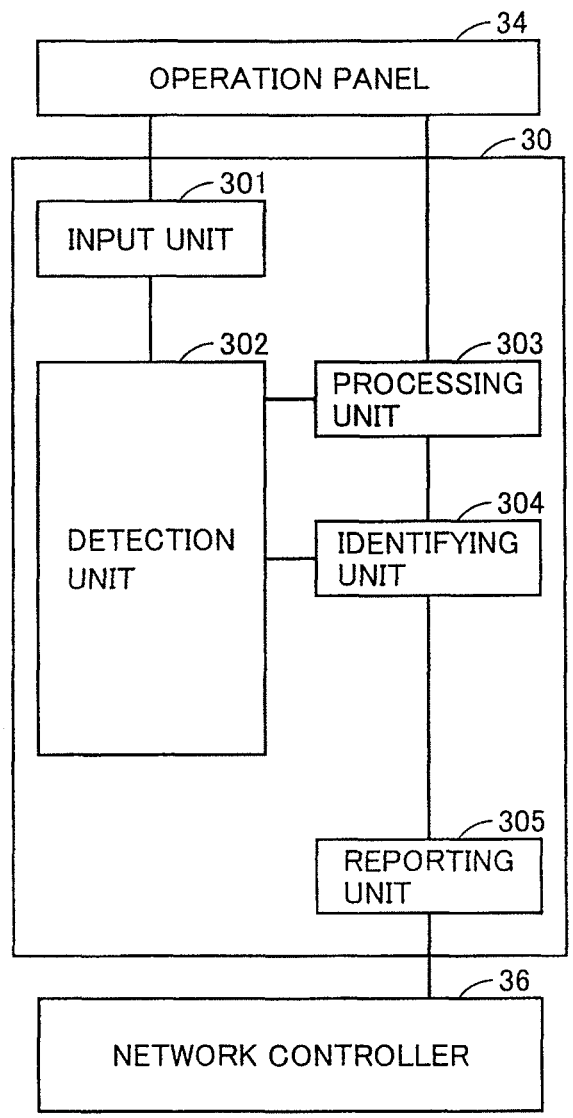
FIG. 15 is a block diagram showing a specific example of a functional configuration of the portable terminal.

FIG. 15 is a block diagram showing a specific example of a functional configuration of portable terminal 300. Each function shown in FIG. 15 is a function mainly configured in CPU 30 by CPU 30 reading a program stored in ROM 31 and executing the program on RAM 32. However, at least some functions may be configured by the hardware configuration shown in FIG. 3.

Referring to FIG. 15, as functions for achieving the above-described operations, portable terminal 300 includes an input unit 301 for receiving input of an operation signal indicating an instruction on operation panel 34, a detection unit 302 for detecting the above-described pinch-out gesture based on the operation signal, a processing unit 303 for executing an application process based on the operation signal indicating a usual instruction on operation panel 34, an identifying unit 304 for identifying an application being executed in processing unit 303 when a pinch-out gesture has been performed, and a reporting unit 305 in which server 500 is stored as a report destination and for executing a process of transmitting pinch-out information, such as information that identifies an application to be pinched in, information that identifies the date and time when the pinch-out gesture is detected, information that identifies a login user when the pinch-out gesture is detected, to server 500 through network controller 36 and reporting that the pinch-out gesture has been performed.

Figure 16:
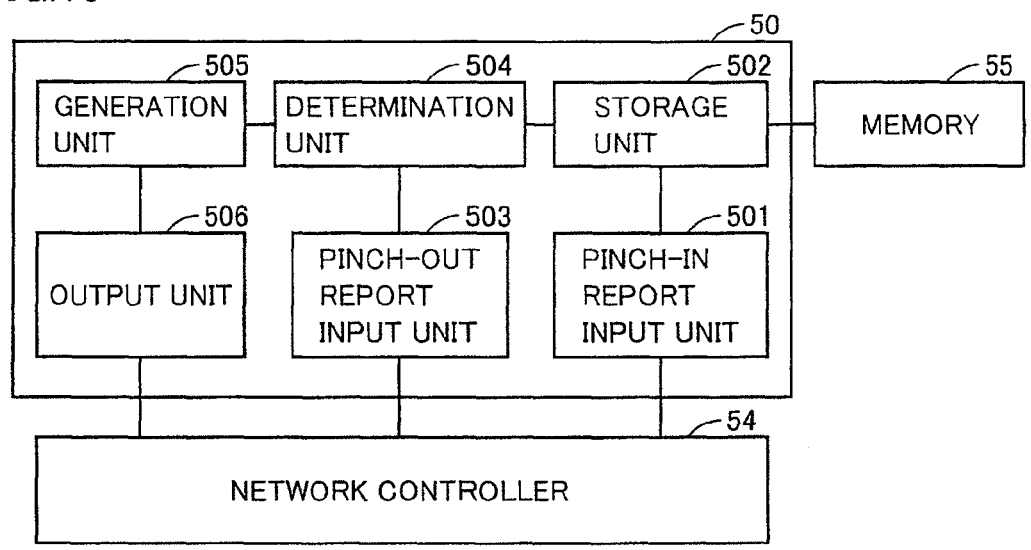
FIG. 16 is a block diagram showing a specific example of a functional configuration of the server.

FIG. 16 is a block diagram showing a specific example of a functional configuration of server 500. Each function shown in FIG. 16 is a function mainly configured in CPU 50 by CPU 50 reading a program stored in ROM 51 and executing the program on RAM 52. However, at least some functions may be configured by the hardware configuration shown in FIG. 4.

Referring to FIG. 16, as functions for achieving the above-described operations, server 500 includes a pinch-in report input unit 501 for receiving a report that a pinch-in gesture has been performed and input of pinch-in information from MFP 100 through network controller 54, a storage unit 502 for executing a process of storing the pinch-in information in a predetermined area of memory 55, a pinch-out report input unit 503 for receiving a report that a "pinch-out" gesture has been performed and input of pinch-out information from portable terminal 300 through network controller 54, a determination unit 504 previously storing an operation to be executed by MFP 100 in association with a combination of applications and for determining a process to be executed by MFP 100 based on the relation between an application being executed when a pinch-out gesture has been performed included in pinch-out information and an application presented by an icon subjected to the gesture included in pinch-in information, a generation unit 505 for generating a command as described above for causing MFP 100 to execute that process, and an output unit 506 for transmitting that command to MFP 100 through network controller 54.

It is noted that a specific example of the command includes those described above, and such a command may be previously stored in determination unit 504 in accordance with a process executed by MFP 100. In that case, generation unit 505 does not need to be included in the functions of server 500.

<Flow of Operations in MFP>

Figure 17:
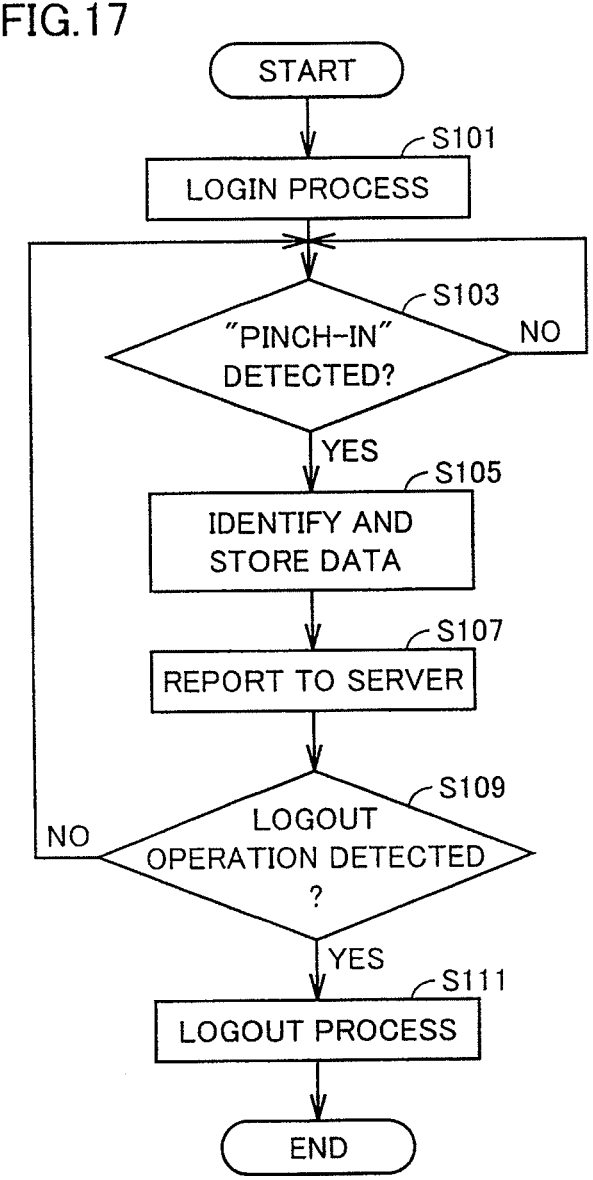
FIG. 17 is a flow chart showing an operation in MFP in response to a pinch-in gesture.

FIG. 17 is a flow chart showing a specific example of operations in MFP 100 in accordance with a pinch-in gesture. The operations shown in the flow chart of FIG. 17 are implemented by CPU 10 reading a program stored in ROM 11 and causing the respective functions shown in FIG. 9 to be effected.

Referring to FIG. 17, in Step S101, CPU 10 executes a login process by receiving a login operation. Then, when it is detected that the pinch-in gesture has been performed on an application menu screen displayed on operation panel 15 (YES in Step S103), CPU 10, in Step S105, identifies an application corresponding to an icon indicated by that gesture, and stores the identified application in a predetermined area of memory 16 as pinch-in information together with other information. Then, in Step S107, CPU 10 transmits the pinch-in information and reports to server 500 previously stored as a report destination that the pinch-in gesture has been performed.

It is noted that when a pinch-in gesture is detected again until a logout operation is detected (NO in Step S109 and YES in Step S103), the above operation will be repeated. In the present embodiment, it is assumed that a specific operation is executed in MFP 100 so that information is transmitted from MFP 100 to portable terminal 300 by continuation of a series of operations in which a pinch-in gesture is performed on MFP 100 and a pinch-out gesture is performed on portable terminal 300. Therefore, by the above-described operation being repeated here several times, pinch-in information stored is overwritten to be information obtained by the latest pinch-in gesture.

When a logout operation is detected (YES in Step S109), CPU 10 executes a logout process in Step S111, and terminates the sequential operation.

It is noted that, although not illustrated, a generally similar operation is executed in portable terminal 300, and when a pinch-out gesture is performed, server 500 is reported to that effect, and pinch-out information is transmitted to server 500.

<Flow of Operations in Server>

Figure 18:
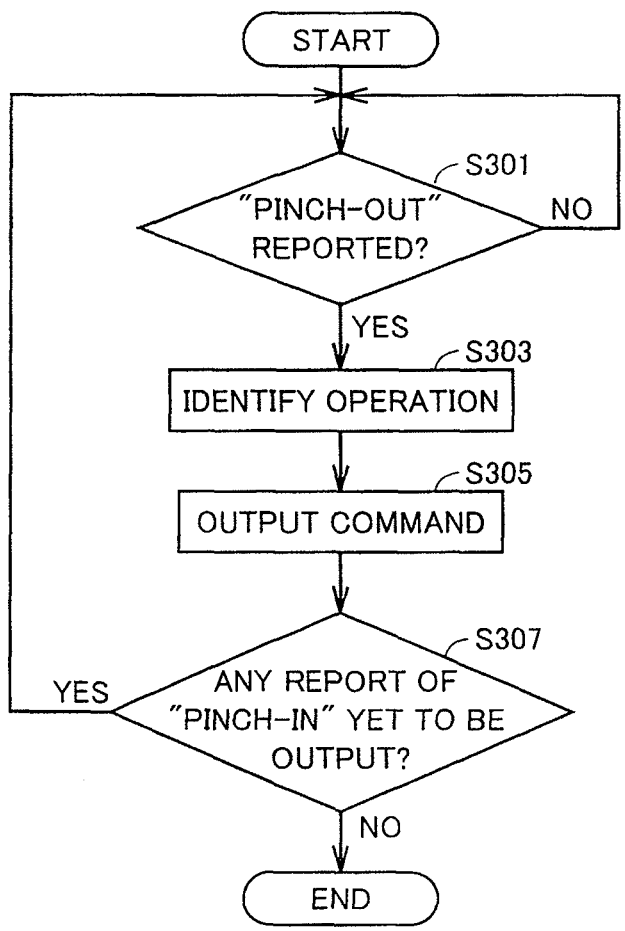
FIG. 18 is a flow chart showing a specific example of operation in the server.

FIG. 18 is a flow chart showing an operation in server 500. The operation shown in the flow chart of FIG. 18 are implemented by CPU 50 reading a program stored in ROM 51 and executing the program on RAM 52.

Referring to FIG. 18, upon receipt of a report from portable terminal 300 that a pinch-out gesture has been performed (YES in Step S301), CPU 50 in Step S303 extracts, as related pinch-in information, pinch-in information transmitted from MFP 100 as a device previously associated with portable terminal 300. Preferably, in Step S303, CPU 50 analyzes pinch-out information, and extracts pinch-in information associated with a user identical to a user associated with that pinch-out information transmitted from MFP 100. As described above, MFP 100 overwrites and identifies the latest pinch-in information in response to one login, and transmits it to server 500. This is because, when the above-described operation has been executed for each of different login users and different types of pinch-in information have been identified, a plurality of types of pinch-in information that vary among users may be transmitted to server 500 and stored therein.

In Step S303, CPU 50 identifies an operation to be executed by MFP 100 based on a combination of an application associated with pinch-out information and an application associated with pinch-in information. Then, in Step S305, CPU 50 transmits a command for causing MFP 100 to execute that operation, to MFP 100. Preferably, CPU 50 deletes the stored pinch-in information when transmission of the above-described command is completed. This is because unprocessed latest pinch-in information will then be stored in server 500, and CPU 50 should only perform the operation for the stored pinch-in information.

The above operation is performed for each piece of stored pinch-in information. Therefore, if pinch-in information for which no command has been output to MFP 100 is stored (YES in Step S307), a report that a pinch-out gesture has been performed from corresponding user's portable terminal 300 is awaited, and the above operation is repeated. Once the above operation is performed for all pieces of stored pinch-in information (NO in Step S307), the sequential operation is terminated.

<Effects of Embodiment>

A command is transmitted to MFP 100 by server 500 performing the operation shown in FIG. 18.

In MFP 100 having received that command, CPU 10 executes an operation in accordance with that command.

For example, as mentioned in the above example, when a command for causing a scanning operation to be executed and causing obtained image data to be transmitted to portable terminal 300 together with a command for causing the obtained image data to be stored in a folder on which the "pinch-out" gesture has been performed is transmitted from server 500, MFP 100 activates an application for executing a scanning operation in accordance with that command, and executes a scanning operation. Then, MFP 100 transmits obtained image data to portable terminal 300 together with the indicated command. Further, portable terminal 300 having received the image data and the command executes an operation of storing the image data in a folder identified by a pinch-out gesture performed in accordance with that command.

For example, when a command for causing a scanning operation to be executed and causing obtained image data to be transmitted to portable terminal 300 together with a command for causing the obtained image data to be attached to an e-mail message being composed as attached data is transmitted from server 500, MFP 100 activates an application for executing a scanning operation in accordance with that command, and executes a scanning operation. Then, MFP 100 transmits obtained image data to portable terminal 300 together with the indicated command. Further, portable terminal 300 having received the image data and the command executes an operation of attaching the image data to an e-mail message for transmission being composed as attached data in accordance with that command.

For example, when a command for causing an application previously stored in MFP 100 as an application for achieving a user interface that allows a scan image in MFP 100 to be input to be transmitted to portable terminal 300 together with a command for causing the application to be installed is transmitted from server 500, MFP 100 reads a corresponding application in accordance with that command, and transmits the application to portable terminal 300 together with the indicated command. Further, portable terminal 300 having received this application and the command executes an operation of installing the received application as a scanner application, in accordance with that command.

With such operations being executed in the image forming system according to the present embodiment, at the time of transmission of information from MFP 100 previously associated with user's own portable terminal 300 to portable terminal 300, the user merely performs a pinch-in gesture on MFP 100 on a command presenting an application necessary for that information and then, with an application necessary for processing that information being activated, performs a pinch-out gesture on a screen for that application, which allows that information to be transmitted from MFP 100 and then continuously processed by that application.

Accordingly, with intuitive and easy manipulations of pinching in a necessary command on MFP 100 as a source and pinching out on an application being executed in portable terminal 300 as a destination, the user is able to cause necessary information to be transmitted from MFP 100 to portable terminal 300 and executed on that application. That is, this allows a desired device to execute a desired application with intuitive and easy manipulations, without being aware that a device that indicates and a device in which an application is to be executed are different, a device that holds information for use in an application and a device in which the application is to be executed are different.

Other Examples

For specific examples of operation, other examples will be described.

Second Specific Example

Figure 19:
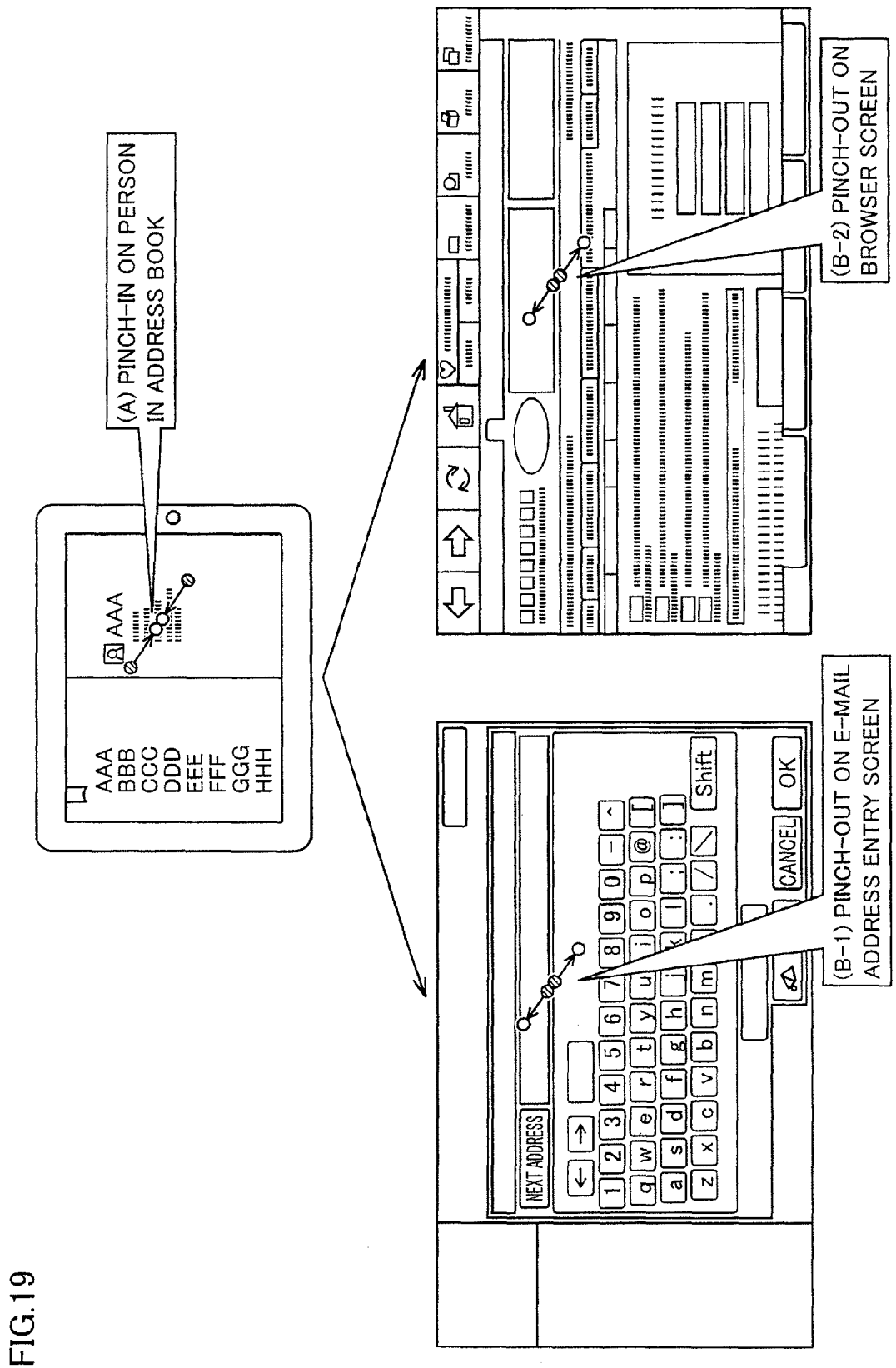
FIG. 19 illustrates a second specific example of gestures in the image forming system.

FIG. 19 illustrates a second specific example of gestures in the image forming system according to the present embodiment.

In the above-described first example, by first performing a pinch-in gesture on MFP 100 and then performing a pinch-out gesture on portable terminal 300, an operation in accordance with each application shall be executed in MFP 100, and information shall be transmitted from MFP 100 to portable terminal 300. However, MFP 100 and portable terminal 300 may be exchanged.

Specifically, referring to FIG. 19, in the second example, the user performs a pinch-in gesture on address information to be processed on a screen of portable terminal 300 that is executing an address book application (at (A) in FIG. 19).

Then, the user logs in, and performs a pinch-out gesture on a screen of MFP 100 in which an application for causing a process using the address information to be executed is being activated. FIG. 19 shows at (B-1) an example in which an application for e-mail transmission is executed in MFP 100 and an e-mail composition screen is displayed on operation panel 15. FIG. 19 shows at (B-2) an example in which a WEB browsing application is executed in MFP 100 and a browser screen is displayed on operation panel 15.

Then, by performing "pinch-out" gestures on operation panel 15 as shown in FIG. 19 at (B-1), (B-2), server 500 having received these reports identifies a process to be executed by portable terminal 300 based on an application (address book application) on which a pinch-in gesture has been performed and an application being executed when a pinch-out gesture has been performed. By that process being executed in portable terminal 300 in accordance with a command from server 500, predetermined information is transmitted from portable terminal 300 to MFP 100.

Specifically, in the example shown at (B-1) in FIG. 19, server 500 transmits, to portable terminal 300, a command for causing address information identified by the pinch-in gesture to be transmitted to MFP 100 together with a command for causing an e-mail address obtained from that information to be entered into an address entry field. Portable terminal 300 in accordance with that command transmits the address information identified by the pinch-in gesture to MFP 100 together with the indicated command. Then, MFP 100 having received the information and the command executes an operation of entering the address obtained from the received address information into the address entry field on a composition screen of the e-mail composition application being executed.

In the example shown at (B-2) in FIG. 19, server 500 transmits, to portable terminal 300, a command for causing address information identified by the pinch-in gesture to be transmitted to MFP 100 together with a command for causing a WEB address (URL (Uniform Resource Locators)) obtained from that information to be entered into a URL display field. Portable terminal 300 in accordance with that command transmits the address information identified by the pinch-in gesture to MFP 100 together with the indicated command. Then, MFP 100 having received the information and the command executes an operation of entering URL obtained from the received address information into a URL entry field on a browser screen of a WEB browsing application being executed.

Third Specific Example

Figure 20:
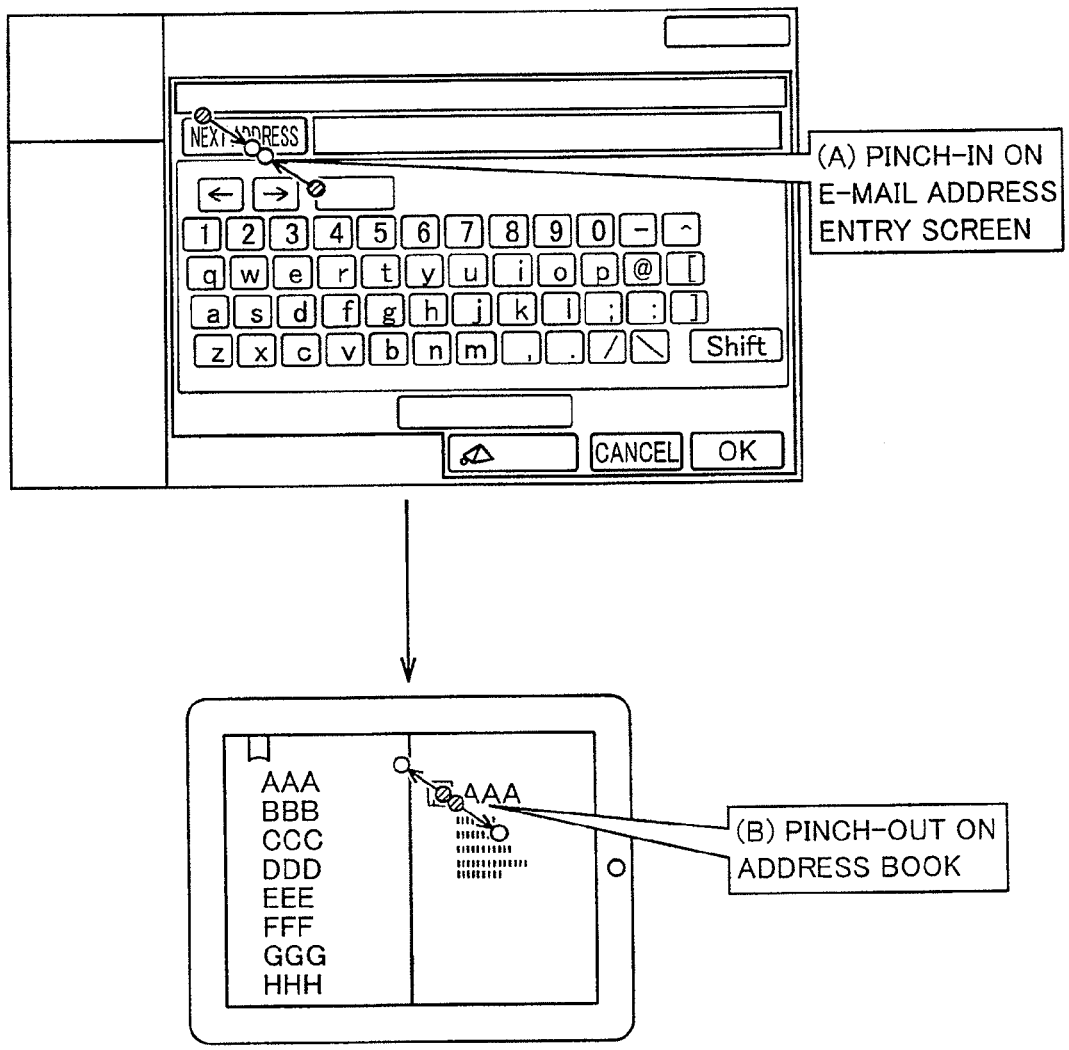
FIG. 20 illustrates a third specific example of gestures in the image forming system.

FIG. 20 illustrates a third specific example of gestures in the image forming system according to the present embodiment.

In the above-described first and second examples, by executing an operation identified in a device on which a pinch-in gesture has been performed, information shall be transmitted from the device on which the pinch-in gesture has been performed to a device on which a pinch-out gesture has been performed. However, the operation may be performed with the devices exchanged. That is, by executing an operation identified in a device on which a pinch-out gesture has been performed, information shall be transmitted from a device on which the pinch-out gesture has been performed to a device on which a pinch-in gesture has been performed. In this case, in the flow of operations in the image forming system described with reference to FIG. 8, operations in Steps S23 to S25 and Step S19 will be different. That is, server 500 identifies an operation to be executed in a device on which a pinch-out gesture has been performed based on the combination of applications, and transmits a command for causing that operation to be executed to the device on which the pinch-out gesture has been performed. Then, the device having received that command executes the operation in accordance with that command, and transmits identified information to a device on which a pinch-in gesture has been performed.

For further details, referring to FIG. 20, in the third example, the user performs a pinch-in gesture on an address entry field as a field for processing information on a screen of MFP 100 that is executing an application for processing address information, such as an e-mail transmission application or a WEB browsing application, for example (at (A) in FIG. 20). Then, a pinch-out gesture is performed on address information to be processed on a screen of portable terminal 300 that is executing an address book application (at (B) in FIG. 20).

Server 500 having received reports that these operations have been performed identifies a process to be executed in portable terminal 300 based on an application (e-mail transmission application or WEB browsing application) being executed in MFP 100 on which the pinch-in gesture has been performed and an application (address book application) being executed in portable terminal 300 when the pinch-out gesture has been performed.

Specifically, in this example, server 500 identifies that an operation of transmitting address information identified by the pinch-out gesture to MFP 100 together with a command for causing an e-mail address or URL obtained from that information to be entered into an entry field is to be executed by portable terminal 300, and transmits a command for that operation to portable terminal 300. Portable terminal 300 in accordance with that command transmits address information identified by the pinch-out gesture to MFP 100 together with the indicated command. Then, MFP 100 having received the information and the command executes the operation of entering an address obtained from the received address information into the entry field on a screen of an application being executed.

Fourth Specific Example

In the above examples, in order to use information that belongs to any device in an application in another device, that information shall be transmitted to the other device. However, information used in an application in one device may be transmitted to an other device, and a corresponding application may be activated in the other device to process that information.

Figure 21:
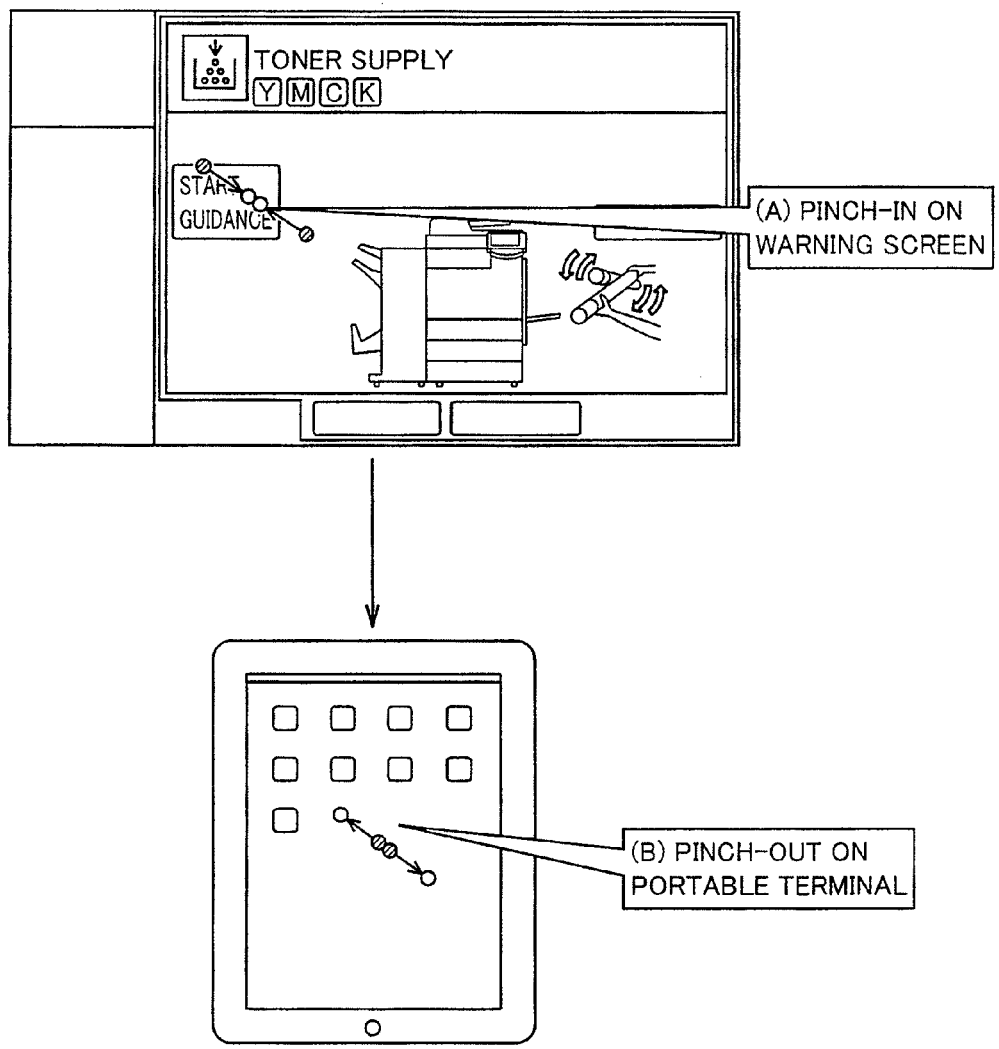
FIG. 21 illustrates a fourth specific example of gestures in the image forming system.

FIG. 21 illustrates a fourth specific example of gestures in the image forming system according to the present embodiment.

For further details, referring to FIG. 21, in the fourth example, when a screen based on some information, such as a warning screen, for example, is displayed on MFP 100, the user performs a pinch-in gesture on that screen (at (A) in FIG. 21). Then, the user performs a pinch-out gesture on a screen (standby screen) of portable terminal 300 that is executing an application for displaying the standby screen (at (B) in FIG. 21).

Server 500 having received a report that these gestures have been performed identifies a process to be executed by portable terminal 300 based on an application (application for reproducing a screen) being executed in MFP 100 on which the pinch-in gesture has been performed and an application (application for displaying the standby screen) being executed in portable terminal 300 when a pinch-out gesture has been performed.

Specifically, in this example, server 500 identifies that an operation of transmitting, to MFP 100, information displayed by an application being executed when the pinch-in gesture has been performed (information on a still image or a moving image) together with a command for reproducing an image based on that information is to be executed by MFP 100, and transmits a command for that operation to MFP 100. MFP 100 in accordance with that command transmits information on the image being displayed to portable terminal 300 together with the indicated command. Then, in portable terminal 300 having received the information and the command, an application being executed is changed to an application for reproducing an image, and an operation for reproducing an image based on the received information (in this example, a warning screen) is executed.

Fifth Specific Example

It is noted that, in the above examples, information shall be transmitted from one device to another device, and a command for processing that information shall also be transmitted. However, information may not necessarily be transmitted, and only a command for causing another device to activate an application corresponding to an application in accordance with a pinch-in gesture and causing specific information to be processed by that application may be transmitted from one device to the other device.

Figure 22:
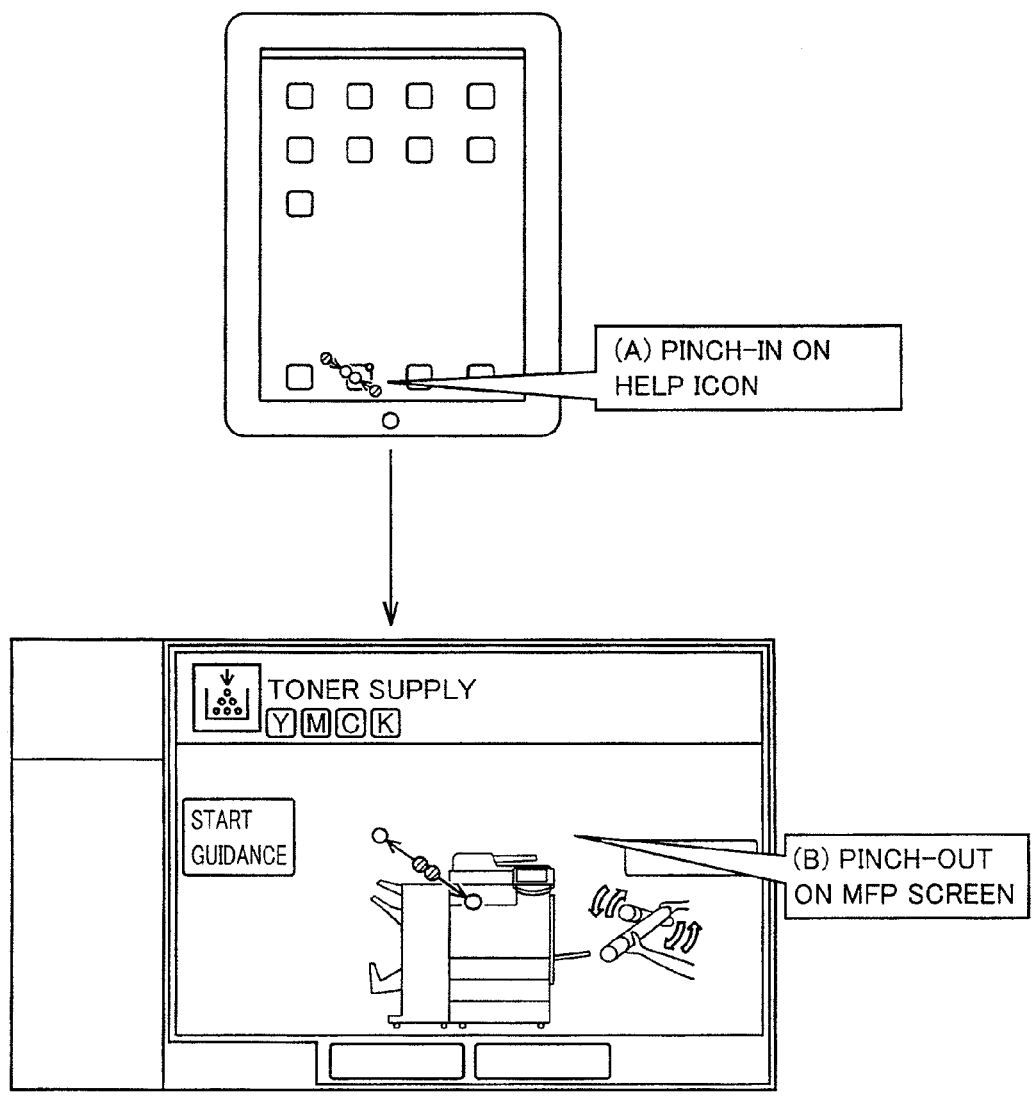
FIG. 22 illustrates a fifth specific example of gestures in the image forming system.

FIG. 22 illustrates a fifth specific example of gestures in the image forming system according to the present embodiment.

For further details, referring to FIG. 22, in the fifth example, when an application for displaying a standby screen is executed in portable terminal 300, the user performs a pinch-in gesture on an icon corresponding to an application (application for reproducing a help screen) displayed on that screen (standby screen) (at (A) in FIG. 22). Then, the user performs a pinch-out gesture on a screen of MFP 100 that is executing an application (application for displaying a screen for prompting maintenance) (at (B) in FIG. 22).

Server 500 having received a report that these gestures have been performed identifies a process to be executed by portable terminal 300 based on an application (application for reproducing a help screen) corresponding to an icon on which the pinch-in gesture has been performed in portable terminal 300 and an application being executed in MFP 100 when a pinch-out gesture has been performed.

Specifically, in this example, server 500 identifies that an operation of transmitting, to MFP 100, a command for reproducing the help screen presented by the icon on which the pinch-in gesture has been performed is to be executed by portable terminal 300, and transmits a command for that operation to portable terminal 300. Portable terminal 300 in accordance with that command transmits the indicated command to MFP 100. Then, MFP 100 having received the command performs an operation for reproducing a help screen related to an application being executed for displaying a screen prompting maintenance.

Even in the case where the image forming system according to the present embodiment executes each operation shown by the second to fifth examples, the user is allowed to have a desired device execute a desired application with intuitive and easy manipulations of pinch-in and pinch-out gestures, without being aware that a device that indicates and a device in which an application is to be executed are different, a device that holds information for use in the application and a device in which the application is to be executed are different.

<Variation>

It is noted that, in the above examples, server 500 shall be included in the image forming system, and server 500 shall receive reports from MFP 100 and portable terminal 300 to determine an operation to be executed. However, server 500 may not be included, but the functions shown in FIG. 15 may be implemented by CPU of MFP 100 and/or portable terminal 300. That is, MFP 100 and/or portable terminal 300 themselves/itself may include the functions of above-described server 500 to operate as above-described server 500.

Further, a program for causing the above-described operations in above-described MFP 100, the above-described operations in portable terminal 300, and above-described operations in server 500 to be performed can also be offered. Such a program can be recorded on a computer-readable recording medium, such as a flexible disk attached to a computer, a CD-ROM (Compact Disk-Read Only Memory), a ROM, a RAM, a memory card, or the like, and can be offered as a program product. Alternatively, a program can be offered as recorded on a recording medium such as a hard disk built in a computer. Still alternatively, the program can also be offered by downloading through a network.

It is noted that the program according to the present invention may cause the process to be executed by invoking a necessary module among program modules offered as part of an operating system (OS) of a computer with a predetermined timing in a predetermined sequence. In that case, the program itself does not include the above-described module, but the process is executed in cooperation with the OS. Such a program not including a module may also be covered by the program according to the present invention.

Moreover, the program according to the present invention may be offered as incorporated into part of another program. Also in such a case, the program itself does not include the module included in the above-described other program, and the process is executed in cooperation with the other program. Such a program incorporated into another program may also be covered by the program according to the present invention.

An offered program product is installed in a program storage unit, such as a hard disk, and is executed. It is noted that the program product includes a program itself and a recording medium on which the program is recorded.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming apparatus comprising:
a touch panel;
a memory;
a communication device that communicates with a terminal device; and
a hardware processor that:
detects a first gesture that is a pinch-in gesture by a user on the touch panel of the image forming apparatus, identifies a program represented by an icon displayed in an area subjected to the first gesture, causes the memory to store first information that identifies the program, reads the first information from the memory in accordance with a command, wherein the command is determined based on the program and an object on a touch panel of the terminal device subjected to a second gesture that is a pinch-out gesture by a user, and wherein the object is displayed in the terminal device when the second gesture has been detected, executes an operation, wherein the executed operation corresponds to the program subjected to the first gesture, and transmits second information that includes data obtained by the operation to the terminal device indicated by the command.

2. The image forming apparatus according to claim 1, wherein, the hardware processor receives, from the terminal device, a report that the second gesture has been detected as well as third information that identifies the object, and the hardware processor determines the operation to be executed by the image forming apparatus based on the program and the object.

3. The image forming apparatus according to claim 2, wherein the hardware processor previously stores the operation to be executed by the image forming apparatus in association with a combination of programs, and reads an operation associated with the program subjected to the first gesture and the object subjected to the second gesture, thereby determining the operation to be executed by the image forming apparatus.

4. The image forming apparatus according to claim 2, wherein the hardware processor further executes a login process of performing user authentication using user information, the first information includes the user information, the third information includes information that identifies a login user when the object has been displayed in the terminal device, and the hardware processor determines the operation when the user information included in the program indicates the login user when the object has been displayed.

5. The image forming apparatus according to claim 1, wherein when the hardware processor detects the first gesture, the hardware processor transmits a report of the detected first gesture and the first information to a server using the communication device, and the command is transmitted from the server.

6. The image forming apparatus according to claim 5, wherein when the hardware processor detects the second gesture, the hardware processor identifies the object being displayed when the second gesture has been detected; and when the hardware processor detects the second gesture, the hardware processor transmits a report of the detected second gesture and the third information that identifies the object to the server using the communication device.

7. The image forming apparatus according to claim 1, wherein the hardware processor further executes a login process of performing user authentication using user information, the first information includes the user information, and the hardware processor causes the memory to store the first information including the user information by overwriting the first information.

8. The image forming apparatus according to claim 1, wherein the hardware processor transmits a command for causing information in accordance with the operation to be processed, to the terminal device.

9. An image forming apparatus comprising:

a touch panel;

a communication device that communicates with a terminal device; and a hardware processor that:

detects a first gesture that is a pinch-out gesture by a user on the touch panel of the image forming apparatus, identifies an object being displayed when the first gesture has been detected, when the hardware processor detects the first gesture, the hardware processor transmits a report that the first gesture has been detected and first information that identifies the object to a server using the communication device, wherein the server determines a command based on the object and a program subjected to a second gesture that is a pinch-in gesture by a user on a touch panel of the terminal device, wherein the program is represented by an icon displayed in an area subjected to the second gesture, and the hardware processor processes information related to an operation received from the terminal device having executed the operation in accordance with the command from the server by displaying the object, wherein the executed operation corresponds to the program subjected to the second gesture.

10. A terminal device comprising:

a touch panel;

a memory;

a communication device that communicates with an image forming apparatus; and a hardware processor that:

detects a first gesture that is a pinch-in gesture by a user on the touch panel of the terminal device, identifies a program represented by an icon displayed in an area subjected to the first gesture, causes the memory to store first information that identifies the program, reads the first information from the memory in accordance with a command, wherein the command is determined based on the program and an object on a touch panel of an image forming apparatus subjected to a second gesture that is a pinch-out gesture by a user, and wherein the object is displayed in the image forming apparatus when the second gesture has been detected, executes an operation, wherein the executed operation corresponds to the program subjected to the first gesture, and transmits second information that includes data obtained by the operation to the image forming apparatus indicated by the command.

11. The terminal device according to claim 10, wherein, the hardware processor receives, from the image forming apparatus, a report that the second gesture has been detected and third information that identifies the object, and the hardware processor determines the operation to be executed by the terminal device based on the program and the object.

12. A terminal device comprising:
a touch panel;
a communication device that communicates with an image forming apparatus; and
a hardware processor that:
  detects a first gesture that is a pinch-out gesture by a user on the touch panel of the terminal device,
  identifies an object being executed when the gesture has been detected,
  when the hardware processor detects the first gesture the hardware processor transmits a report that the first gesture has been detected and first information that identifies the object to a server using the communication device, wherein the server determines a command based on the object and a program subjected to a second gesture that is a pinch-in gesture by a user on a touch panel of an image forming apparatus, wherein the program is represented by an icon displayed in an area subjected to the second gesture, and
  the hardware processor processes information related to an operation received from the image forming apparatus having executed the operation in accordance with the command from the server by displaying the object, wherein the executed operation corresponds to the program subject to the second gesture.

13. An image forming system comprising:
an image forming apparatus;
a terminal device;
a server,
the image forming apparatus and the terminal device each including a touch panel, and a memory,
one of the image forming apparatus and the terminal device being represented by a first device, and the other one being represented by a second device;
a hardware processor of the first device that:
  detects a first gesture that is a pinch-in gesture by a user on the touch panel of the first device and a second gesture that is a pinch-out gesture by the user on the touch panel of the first device,
  identifies a program represented by an icon displayed in an area subjected to the first gesture as the program subjected to the first gesture,
  causes the memory of the first device to store first information that identifies the program subjected to the first gesture,
  when the hardware processor of the first device detects the first gesture, the hardware processor of the first device transmits a report that the first gesture has been detected and the first information to the server,
  when the hardware processor of the first device detects the second gesture, the hardware processor of the first device identifies an object being displayed when the second gesture has been detected as an object subjected to the second gesture,
  when the hardware processor of the first device detects the second gesture, the hardware processor of the first device transmits a report that the second gesture has been detected and second information that identifies the object subjected to the second gesture to the server,
  reads the first information from the memory of the first device in accordance with a command transmitted from the server to execute an operation, wherein the executed operation corresponds to the program subjected to the first gesture,
  transmits information that includes data obtained by the operation to the second device indicated by the command, and
  displays the object subjected to the second gesture, and
a hardware processor of the second device that:
  detects a third gesture that is a pinch-in gesture by a user on the touch panel of the second device and a fourth gesture that is a pinch-out gesture by the user on the touch panel of the second device,
  identifies a program represented by an icon displayed in an area subjected to the third gesture as the program subjected to the third gesture,
  causes the memory of the second device to store third information that identifies the program subjected to the third gesture,
  when the hardware processor of the second device detects the third gesture, the hardware processor of the second device transmits a report that the third gesture has been detected and third information that identifies the program subjected to the third gesture to the server,
  when the hardware processor of the second device detects the fourth gesture, the hardware processor of the second device identifies an object being executed when the fourth gesture has been detected as an object subjected to the fourth gesture,
  when the fourth gesture is detected, reporting to that effect to the server, and transmitting information that identifies the object subjected to the fourth gesture to the server,
  reads the third information from the memory of the second device in accordance with a command transmitted from the server to execute an operation, wherein the executed operation corresponds to the program subjected to the first gesture,
  transmits information that includes data obtained by the operation to the first device indicated by the command, and
  displays the object subjected to the fourth gesture,
the server, upon receipt of the report from the first device that the first gesture has been detected, stores the first information,
the server, upon receipt of the report from the second device that the third gesture has been detected, stores the third information,
the server, upon receipt of the report from the first device that the second gesture has been detected and the second information reads the third information to determine the operation to be executed by the second device based on the object subjected to the second gesture and the program subjected to the third gesture, and
the server, upon receipt of the report from the second device that the fourth gesture has been detected and the fourth information, the first information to determine the operation to be executed by the first device based on the program subjected to the first gesture and the object subjected to the fourth gesture.

14. A non-transitory computer-readable storage medium having recorded thereon a control program that causes an image processing apparatus having a touch panel, a hardware processor, and a memory to execute a process, wherein the control program instructs the hardware processor to perform the following steps of:

detecting a first gesture that is a pinch-in gesture by a user on the touch panel of the image forming apparatus;

when the first gesture is detected, identifying a program represented by an icon displayed in an area subjected to the first gesture;

storing information that identifies the program in the memory;

when the first gesture is detected, transmitting a report that the first gesture has been detected and the first information to a server; and upon receipt of a command transmitted from the server, reading the first information from the memory in accordance with the command to execute an operation,
- wherein the command is determined based on the program and an object subjected to a second gesture that is a pinch-out gesture by a user on a touch panel of a terminal device,
- wherein the object is displayed in the terminal device when the second gesture has been detected,
- wherein the executed operation corresponds to the program subjected to the first gesture, and transmitting second information to be processed by the terminal device including data obtained by the operation to the terminal device indicated by the command.

15. A non-transitory computer-readable storage medium having recorded thereon a control program that causes a terminal device having a touch panel, a hardware processor, and a memory to execute a process, wherein the control program instructs the hardware processor to perform the following steps of:

detecting a first gesture that is a pinch-out gesture by a user on the touch panel of the terminal device;

when the first gesture is detected, identifying an object being displayed when the first gesture has been detected as an object subjected to the first gesture;

when the first gesture is detected, transmitting a report that the first gesture has been detected and first information that identifies the object to the server; wherein the server determines a command based on the object and a program subjected to a second gesture that is a pinch-in gesture by a user on a touch panel of the image forming apparatus, wherein the program is represented by an icon displayed in an area subjected to the second gesture, and upon receipt of information related to an operation from the image forming apparatus having executed the operation in accordance with the command from the server, displaying the object, thereby processing the information received from the image forming apparatus, wherein the executed operation corresponds to the program subject to the second gesture.

16. A non-transitory computer-readable storage medium having recorded thereon a control program that causes a server to execute a process, the server previously that stores an operation to be executed by a first device in association with a combination of programs, wherein the control program instructs a hardware processor of the server to perform the following steps of:

upon receipt of, from the first device, a report that a first gesture that is a pinch-in gesture by a user on the touch panel of the first device has been detected and first information that identifies a program subjected to the first gesture, storing the first information in a memory, wherein the program is represented by an icon displayed in an area subjected to the first gesture;

upon receipt of, from a second device, a report that a second gesture that is a pinch-out gesture by a user on the touch panel of the second device has been detected and second information that identifies an object subjected to the second gesture, determining an operation to be executed by the first device based on the program and the object,
- wherein the object is displayed in the second device when the second gesture has been detected, and
- wherein the executed operation corresponds to the program subjected to the first gesture; and transmitting a command for causing the operation to be executed by the first device, to the first device.

* * * * *